US012812350B2

(12) United States Patent
Fu et al.

(10) Patent No.: US 12,812,350 B2
(45) Date of Patent: Nov. 24, 2026

(54) PROXIMITY SERVICES DISCOVERY USER EQUIPMENT IDENTIFIER PROVISIONING

(71) Applicant: Telefonaktiebolaget LM Ericsson (publ), Stockholm (SE)

(72) Inventors: Zhang Fu, Stockholm (SE); Maria Belen Pancorbo Marcos, Madrid (ES); Juying Gan, Shanghai (CN); Fuencisla Garcia Azorero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 326 days.

(21) Appl. No.: 18/284,887

(22) PCT Filed: Mar. 31, 2022

(86) PCT No.: PCT/EP2022/058697
§ 371 (c)(1),
(2) Date: Sep. 29, 2023

(87) PCT Pub. No.: WO2022/207868
PCT Pub. Date: Oct. 6, 2022

(65) Prior Publication Data

US 2024/0179507 A1 May 30, 2024

Related U.S. Application Data

(60) Provisional application No. 63/168,902, filed on Mar. 31, 2021.

(51) Int. Cl.
*H04W 8/00* (2009.01)
*H04W 4/029* (2018.01)

(52) U.S. Cl.
CPC .......... *H04W 8/005* (2013.01); *H04W 4/029* (2018.02)

(58) Field of Classification Search
CPC ........ H04W 8/005; H04W 8/26; H04W 4/029
USPC ........................................................ 455/456.1
See application file for complete search history.

(56) References Cited

U.S. PATENT DOCUMENTS 12,382,294 B2 * 8/2025 Lee ..................... H04W 12/069
2017/0257751 A1 * 9/2017 Atarius ................. H04W 8/005
2020/0007335 A1 * 1/2020 Tan ........................... H04L 9/32
2020/0145876 A1 * 5/2020 Dao .................. H04W 28/0268
(Continued)

FOREIGN PATENT DOCUMENTS

JP 2017-530650 A 10/2017

OTHER PUBLICATIONS

International Search Report and Written Opinion of the International Searching Authority, PCT/EP2022/058697, mailed Jul. 15, 2022, 11 pages.
(Continued)

*Primary Examiner* — Jean A Gelin
(74) *Attorney, Agent, or Firm* — Sage Patent Group

(57) ABSTRACT

There is provided a method of operating a first network function in a communication network. The method includes initiating transmission of first information towards a second network function. The first information is indicative that the first network function is to be subscribed to receive a notification of a change in a proximity services discovery user equipment identifier (PDUID) for a user equipment (UE) from the second network function. The method includes receiving the PDUID for the UE from the second network function.

24 Claims, 17 Drawing Sheets

(56) References Cited

U.S. PATENT DOCUMENTS

| | | | | |
|---|---|---|---|---|
| 2020/0153875 | A1* | 5/2020 | Karampatsis | H04L 65/1016 |
| 2020/0336937 | A1* | 10/2020 | Youn | H04W 28/0289 |
| 2021/0037430 | A1* | 2/2021 | Jin | H04W 36/00224 |
| 2021/0136555 | A1* | 5/2021 | Paladugu | H04W 4/80 |
| 2021/0204104 | A1* | 7/2021 | Zhang | H04W 4/50 |
| 2021/0243272 | A1* | 8/2021 | Diesch | H04L 67/60 |
| 2022/0182923 | A1* | 6/2022 | Yao | H04W 24/10 |
| 2022/0240173 | A1* | 7/2022 | Wang | H04W 48/18 |
| 2022/0295236 | A1* | 9/2022 | Baek | H04W 76/12 |
| 2022/0312299 | A1* | 9/2022 | Mochizuki | H04W 76/14 |
| 2022/0369092 | A1* | 11/2022 | Lee | H04W 8/005 |
| 2022/0369204 | A1* | 11/2022 | Jeong | H04W 76/22 |
| 2022/0377507 | A1* | 11/2022 | Xie | H04W 48/18 |
| 2022/0400378 | A1* | 12/2022 | Wang | H04L 63/108 |
| 2023/0023639 | A1* | 1/2023 | Shi | H04W 12/069 |
| 2023/0037031 | A1* | 2/2023 | Wang | H04L 67/60 |
| 2023/0078317 | A1* | 3/2023 | Xing | H04B 7/15 370/315 |
| 2023/0188993 | A1* | 6/2023 | Lei | H04W 12/08 455/410 |
| 2023/0232196 | A1* | 7/2023 | Xu | H04W 76/11 455/414.1 |
| 2023/0239686 | A1* | 7/2023 | Li | H04W 12/033 726/1 |
| 2023/0354013 | A1* | 11/2023 | Li | H04W 12/02 |
| 2024/0129209 | A1* | 4/2024 | Karampatsis | H04W 24/08 |
| 2024/0146678 | A1* | 5/2024 | Diesch | G06Q 40/03 |
| 2026/0075508 | A1* | 3/2026 | Deng | H04W 12/06 |

OTHER PUBLICATIONS

Ericsson, “K1#8: Update Conclusion for ProSe Discovery UE ID Provisioning,” SA WG2 Meeting #143E (e-meeting), S2-2101631 (Revision of S2-2100214r01), Feb. 24-Mar. 9, 2021, Elbonia, 2 pages.

CATT, “ProSe Discovery UE ID update procedure,” SA WG2 Meeting #107, S2-150836 (revision of S2-15xxxx), Jan. 26-30, 2015, Sorrento, Italy, 3 pages.

Ericsson et al., “ProSe Discovery UE ID management,” SA WG2 #144E (e-meeting), S2-2103503 (Revision of S2-2102292); Apr. 12-16, 2021, Elbonia, 6 pages.

Ericsson, “Pseudo-CR on Subscription to PDUID changes,” 3GPP TSG-CT WG3 Meeting #117e, C3-214494, E-Meeting, Aug. 18-27, 2021, 4 pages.

3GPP TS 23.304 V17.1.1 (Jan. 2022); 3rd Generation Partnership Project; Technical Specification Group Services and System Aspects; Proximity based Services (ProSe) in the 5G System (5GS) (Release 17), 99 pages.

3GPP TS 23.502 V17.0.0 (Mar. 2021); 3rd Generation Partnership Project; Technical Specification Group Services and System Aspects; Procedures for the 5G System (5GS); Stage 2 (Release 17), 646 pages.

3GPP TS 23.304 V0.1.0 (Mar. 2021); 3rd Generation Partnership Project; Technical Specification Group Services and System Aspects; Proximity based Services (ProSe) in the 5G System (5GS) (Release 17), 60 pages.

3GPP TS 23.503 V17.0.0 (Mar. 2021); 3rd Generation Partnership Project; Technical Specification Group Services and System Aspects; Policy and charging control framework for the 5G System (5GS); Stage 2 (Release 17), 128 pages.

3GPP TS 23.303 V15.1.0 (Jun. 2018); 3rd Generation Partnership Project; Technical Specification Group Services and System Aspects; Proximity-based services (ProSe); Stage 2 (Release 15), 130 pages.

3GPP TS 23.502 V16.7.1 (Jan. 2021); 3rd Generation Partnership Project; Technical Specification Group Services and System Aspects; Procedures for the 5G System (5GS); Stage 2 (Release 16), 603 pages.

3GPP TS 23.503 V16.7.0 (Dec. 2020); 3rd Generation Partnership Project; Technical Specification Group Services and System Aspects; Policy and charging control framework for the 5G System (5GS); Stage 2 (Release 16), 119 pages.

3GPP TS 24.501 V17.1.0 (Dec. 2020); 3rd Generation Partnership Project; Technical Specification Group Core Network and Terminals; Non-Access-Stratum (NAS) (protocol) for 5G System (5GS); Stage 3; (Release 17), 745 pages.

Office Action, Japanese Patent Application No. 2023-557174, mailed Sep. 24, 2024, 17 pages.

“3rd Generation Partnership Project; Technical Specification Group Core Network and Terminals; Proximity-services (ProSe) User Equipment (UE) to ProSe function protocol aspects; Stage 3 (Release 17),” 3GPP TS 24.334 V17.0.0 (Dec. 2020), 264 pages.

“3rd Generation Partnership Project; Technical Specification Group Services and System Aspects; Study on system enhancement for Proximity based Services (ProSe) in the 5G System (5GS) (Release 17),” 3GPP TR 23.752 V2.0.0 (Mar. 2021), 183 pages.

“5G System Procedures Updates to Support Dynamically Changing Policies in the 5GC,” 3GPP TSG-SA2 Meeting #143-e, S2-2102060 (Rev. of S2-2000333r04), Online, Feb. 24-Mar. 9, 2021, Nokia, et al., 19 pages.

ETSI TS 123 303 V13.4.0 (Jul. 2016), “Universal Mobile Telecommunications System (UMTS); LTE; Proximity-based services (ProSe); Stage 2 (3GPP TS 23.303 version 13.4.0 Release 13),” 127 pages.

* cited by examiner

PROXIMITY SERVICES DISCOVERY USER EQUIPMENT IDENTIFIER PROVISIONING

CROSS REFERENCE TO RELATED APPLICATIONS

This application is a 35 U.S.C. § 371 national stage application of PCT International Application No. PCT/EP2022/058697 filed on Mar. 31, 2022, which in turn claims domestic priority to U.S. Provisional Patent Application No. 63/168,902, filed on Mar. 31, 2021, the disclosures and content of which are incorporated by reference herein in their entirety.

TECHNICAL FIELD

The present disclosure relates generally to communications and, more particularly, to communication methods and related devices and functions/nodes supporting wireless communications.

BACKGROUND

Proximity Services (ProSe) in fourth generation (4G) systems have been described in clause 4.4.1 of the third generation partnership project (3GPP) technical specification (TS) 23.303 V15.1.0. A ProSe Function is a logical function that is used for network related actions required for ProSe. The ProSe Function plays different roles for each of the features of ProSe. In 3GPP TS 23.303 V15.1.0, there may only be one logical ProSe Function in each public land mobile network (PLMN) that supports ProSe. It is noted that, if multiple ProSe Functions are deployed within the same PLMN (e.g., for load reasons), then methods to locate the ProSe Function that has allocated a specific ProSe Application Code or ProSe Restricted Code (e.g. through a database lookup, etc.) are not defined in 3GPP TS 23.303 V15.1.0.

ProSe Direct Discovery may refer to a procedure employed by a ProSe-enabled user equipment (UE) to discover other ProSe-enabled UEs in its vicinity based on direct radio transmissions between the two UEs with new radio (NR) technology.

ProSe Direct Communication may refer to a communication between two or more UEs in proximity that are ProSe-enabled, by means of user plane transmission using NR technology via a path not traversing any network node.

SUMMARY

According to an aspect of the disclosure, there is provided a method of operating a first network function in a communication network. The method comprises initiating transmission of first information towards a second network function. The first information is indicative that the first network function is to be subscribed to receive a notification of a change in a proximity services discovery user equipment identifier (PDUID) for a user equipment (UE) from the second network function. The method comprises receiving the PDUID for the UE from the second network function.

According to another aspect of the disclosure, there is provided a method of operating a second network function in a communication network. The method comprises subscribing a first network function to receive a notification of a change in a PDUID for a UE from the second network function in response to receiving first information from the first network function. The first information is indicative that the first network function is to be subscribed to receive the notification. The method comprises initiating transmission of the PDUID for the UE towards the first network function.

According to another aspect of the disclosure, there is provided a first network function comprising processing circuitry configured to operate in accordance with the method described in respect of the first network function. In some embodiments, the first network function may comprise at least one memory for storing instructions which, when executed by the processing circuitry, cause the first network function to operate in accordance with the method described in respect of the first network function.

According to another aspect of the disclosure, there is provided a second network function comprising processing circuitry configured to operate in accordance with the method described in respect of the second network function. In some embodiments, the second network function may comprise at least one memory for storing instructions which, when executed by the processing circuitry, cause the second network function to operate in accordance with the method described in respect of the second network function.

According to another aspect of the disclosure, there is provided a method performed by a system. The method performed by the system comprises the method described in respect of the first network function and the method performed in respect of the second network function.

According to another aspect of the disclosure, there is provided a system comprising at least one first network function as described earlier and at least one second network function as described earlier.

According to another aspect of the disclosure, there is provided a computer program comprising instructions which, when executed by processing circuitry, cause the processing circuitry to perform the method described in respect of the first network function and/or the method described in respect of the second network function.

According to another aspect of the disclosure, there is provided a computer program product, embodied on a non-transitory machine-readable medium, comprising instructions which are executable by processing circuitry to cause the processing circuitry to perform the method described in respect of the first network function and/or the method described in respect of the second network function.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
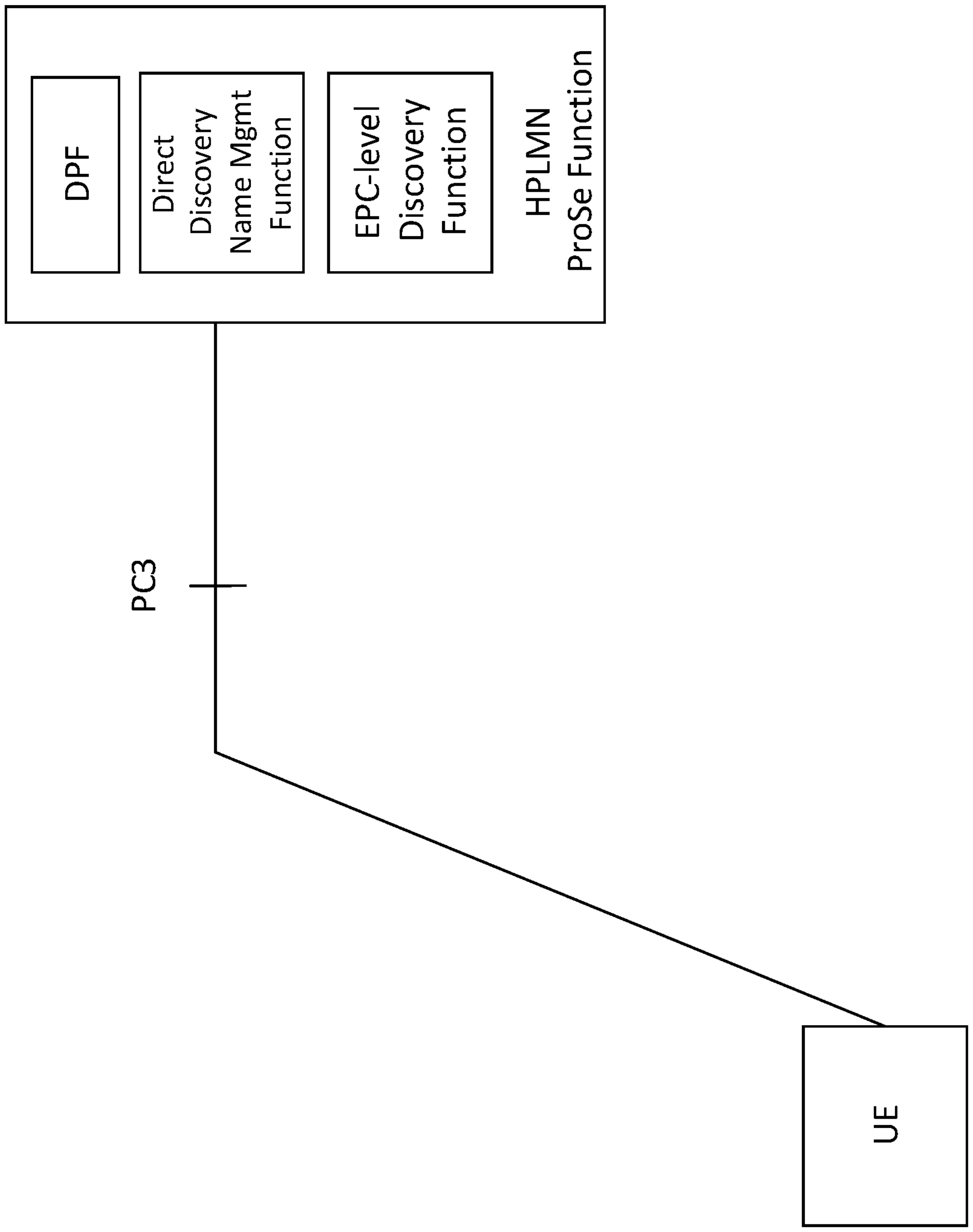
FIG. 1 is a block diagram that illustrates UE to ProSe function interfaces for a plurality of sub-functions according to some embodiments.

Brief reference is made to FIG. 1, which is a block diagram that illustrates UE to ProSe function interfaces for a plurality of sub-functions according to some embodiments. As illustrated, the current ProSe function includes three primary subfunctions that perform in different roles depending on the ProSe feature.

Figure 2:
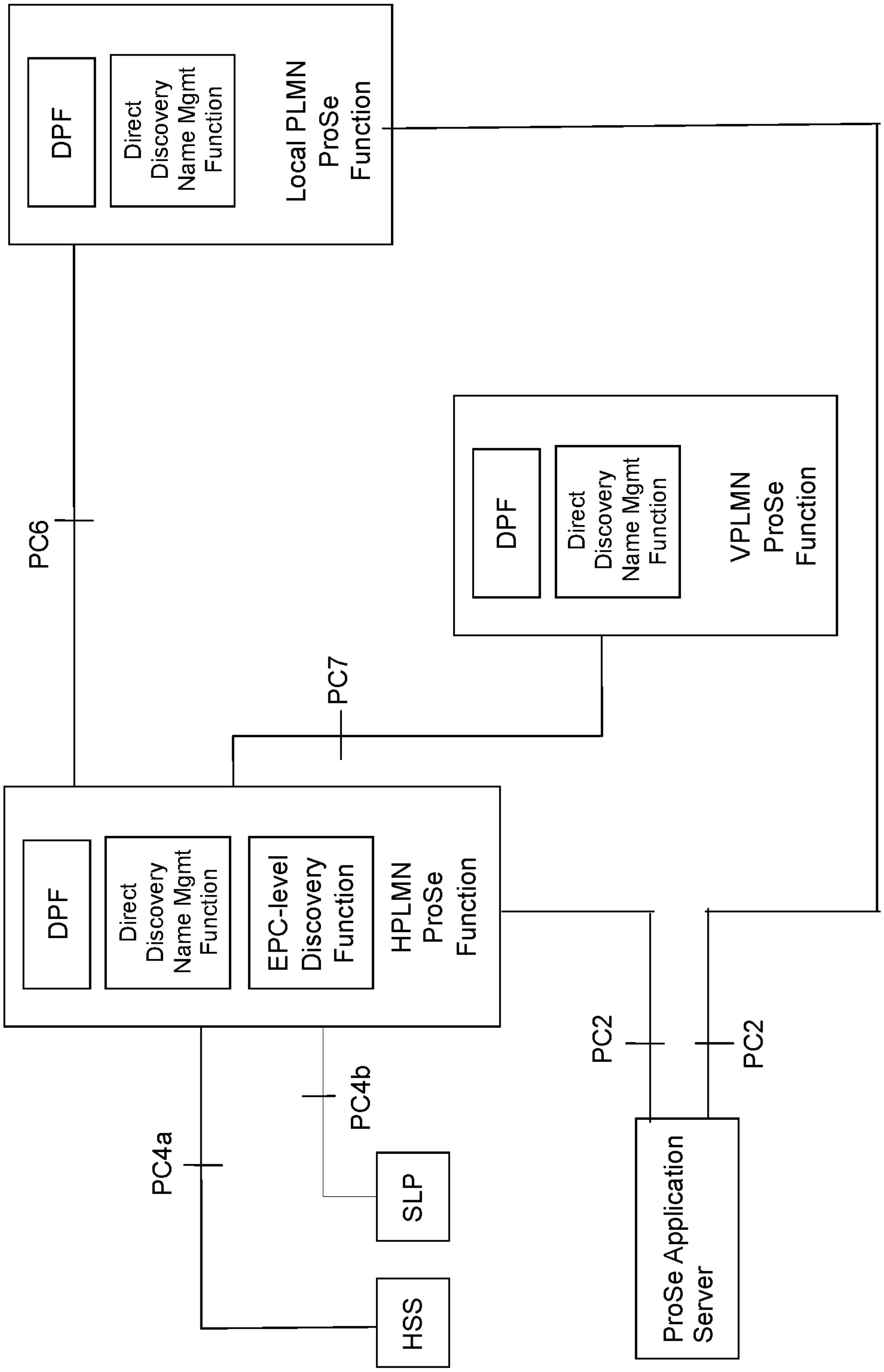
FIG. 2 is a block diagram that illustrates ProSe function interfaces to other network elements and Public Land Mobile Networks (PLMNs) according to some embodiments.

Brief reference is made to FIG. 2, which is a block diagram that illustrates ProSe function interfaces to other network elements and Public Land Mobile Networks (PLMNs) according to some embodiments. As illustrated, the three different subfunctions include a direct provisioning function (DPF), a direct discovery name management function (DDNMF), and an evolved packet core (EPC) level Discovery ProSe Function.

The DPF is used to provision the UE with necessary parameters in order use ProSe Direct Discovery and Prose Direct Communication. It is used to provision the UEs with PLMN specific parameters that allow the UE to use ProSe in this specific PLMN. For direct communication used for public safety, DPF is also used to provision the UE with parameters that are needed when the UE is not served by an Evolved Universal Terrestrial Radio Access Network (E-UTRAN). For restricted ProSe Direct Discovery, the DPF also generates and maintains the proximity services discovery user equipment identifier, which is referred to in the art as the ProSe Discovery UE ID (PDUID).

The DDNMF is used for open ProSe Direct Discovery to allocate and process the mapping of ProSe Applications IDs and ProSe Application Codes used in ProSe Direct Discovery. The DDNMF uses ProSe related subscriber data stored in Home Subscriber Service (HSS) for authorization for each discovery request. The DDNMF also provides the UE with the necessary security material in order to protect discovery messages transmitted over the air. In restricted ProSe Direct Discovery, the DDNMF also interacts with an application server via PC2 reference points for the authorization of the discovery requests.

The EPC-level Discovery ProSe Function has a reference point towards the application server (PC2), towards other ProSe Functions (PC6), towards the HSS (PC4a) and the UE (PC3). The functionality includes the following:

- Storage of ProSe-related subscriber data and/or retrieval of ProSe-related subscriber data from the HSS;
- Authorization and configuration of the UE for EPC-level ProSe Discovery and EPC-assisted wide local area network (WLAN) direct discovery and communication over PC3;
- Storage of a list of applications that are authorized to use EPC-level ProSe Discovery and EPC-assisted WLAN direct discovery and communication; Acting as location services client (e.g. service location protocol (SLP) agent) to enable EPC-level ProSe Discovery;
- Providing the UE with information to assist WLAN direct discovery and communications;
- Handling of EPC ProSe User IDs and Application Layer User IDs;
- Exchange of signalling with third party application servers over PC2 reference point for application registration and identifier mapping;
- Exchange of signalling with ProSe Functions in other PLMNs over PC6 reference points for sending proximity requests, proximity alerts and location reporting;
- Optional support for functionality for requesting UE location via the HSS.

The ProSe Function may support "on demand" announcing requested by UE based on operator's policy, in case of ProSe restricted discovery model.

The ProSe Function provides the necessary charging and security functionality for usage of ProSe (both ProSe via the EPC and for ProSe Direct Discovery, ProSe Direct Communication and WLAN direct discovery and communication).

The ProSe Function in home PLMN (HPLMN) can be always reached if home routed configuration is applied for packet data network (PDN) connection (e.g. PDN gateway (GW) is located in the HPLMN), when such function is supported by the HPLMN. In case of local breakout (e.g. PDN GW is located in the visited PLMN (VPLMN)), a ProSe Proxy Function can be deployed by the VPLMN to support UE to Home ProSe Function communication, if inter-PLMN signalling is required. Whether a PDN connection is provided by local breakout or home routed is determined by the HSS configuration described in 3GPP TS 23.401. UE is not aware of this and as such will not know which access point name (APN) can be used for communication with ProSe Function unless specific APN information is configured in the UE indicating that this APN provides signalling connectivity between the UE and the Home ProSe Function.

Herein, ProSe Discovery is a discovery service that identifies that a UE that is ProSe-enabled is in proximity to one or more other UEs that are ProSe-enabled. For example, the one or more other UEs may be in proximity to the UE when the one or more other UEs are within a predefined area surrounding the UE. In some embodiments, the discovery service may be a restricted and/or direct discovery service. The PDUID referred to herein may be an (e.g. temporary) identifier assigned to the UE for the (e.g. restricted direct) discovery service. The PDUID may be assigned to the UE by the ProSe Function (e.g. in the HPLMN). The PDUID may include the PLMN ID and a (e.g. temporary) identifier that (e.g. uniquely) identifies the UE (e.g. in the HPLMN). As provided in embodiments herein, improvements in transferring the PDUID to the fifth generation (5G) DDNMF may result from using a new event identifier (ID), change of PDUID, e.g. in an existing network Npcf_AMPolicyAuthorization_Subscribe service or Npcf_EventExposure_subscribe service. Npcf refers to an (e.g. service-based) interface for a policy control function (PCF).

The ProSe application server may support the following capability:

- Storage of EPC ProSe User IDs: ProSe Function IDs, ProSe Discovery UE ID, metadata;
- Mapping of Application Layer User IDs and EPC ProSe User IDs;
- Mapping of restricted ProSe application user ID (RPAUID) and PDUID for restricted ProSe Direct Discovery;
- Maintaining permission information for the restricted ProSe Direct Discovery using RPAUIDs;
- Allocation of a ProSe Restricted Code Suffix pool, if restricted Direct Discovery with application-controlled extension is used; and
- Allocation of a mask(s) for ProSe Restricted Code Suffix, if restricted Direct Discovery with application-controlled extension is used.

The usage of PDUID may provide that the ProSe enabled UE retrieves PDUID from the ProSe Function. The UE provides its PDUID to the ProSe application server and get its RPAUID from the server. When the ProSe enabled UE wants to conduct restricted ProSe discovery, it can send either the Announce request or Monitor request to its ProSe Function to get the corresponding restricted discovery code (details are explained in clause 5.3.3 of 3GPP TS 23.303 V15.1.0). In the request, the UE may include its UE ID (i.e. international mobile subscriber identifier (IMSI)) and its RPAUID. If the ProSe Function needs an authorization result from the application server, then it may send an authorization request to the ProSe application server with the RPAUID. The ProSe application server can respond with the UE's PDUID to the ProSe Function if the authorization is OK. The ProSe Function may check to see if the PDUID is the one mapped to the UE ID (i.e. IMSI).

PDUID provisioning in 5G systems may provide that the PCF maintains the PDUID. PDUID is provided to the UE as part of ProSe policy and parameters as described in clause 5.1.2.1 of 3GPP TS 23.304 V0.1.0.

Existing challenges include, for 5G ProSe, that the PCF takes the role of the DPF and is used for policy/parameters provisioning to UE, while 5G DDNMF is still used for Restricted Direct Discovery procedure. Due to the split of ProSe Function functionality into PCF and 5G DDNMF, the ProSe Discovery UE ID is assigned by PCF and used by 5G DDNMF, and then the question comes how does 5G DDNMF get the ProSe Discovery UE ID. Thus, herein, advantageous techniques are described for provisioning the PDUID and, more specifically, for provisioning the PDUID to a first network function such as the 5G DDNMF.

Figure 3:
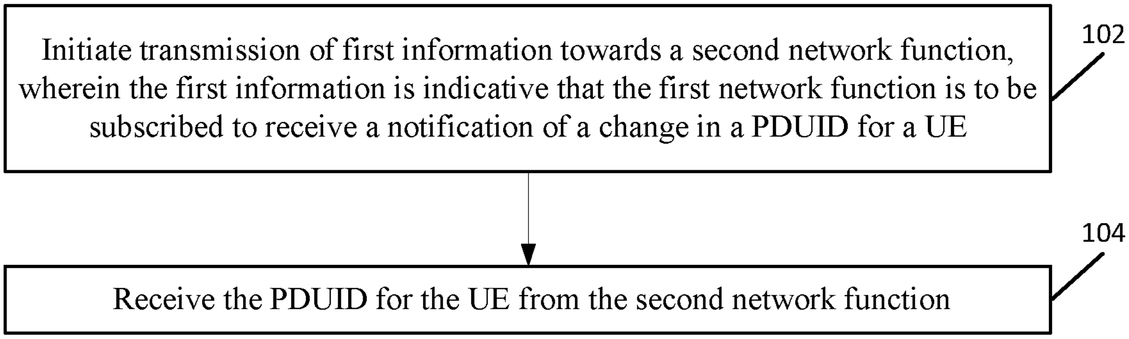
FIG. 3 is a flow chart illustrating a method performed by a first network function according to an embodiment.

FIG. 3 is a block diagram illustrating a method of operating a first network function in a communication network according to an embodiment. Herein, the first network function may also be referred to as a first network function node. The method can be performed by or under the control of processing circuitry of the first network function. As illustrated by block 102 of FIG. 3, transmission of first information is initiated towards a second network function. The first information is indicative that the first network function is to be subscribed to receive a notification of a change in a PDUID for a UE from the second network function. As illustrated by block 104 of FIG. 3, the PDUID for the UE is received from the second network function.

In some embodiments, initiating transmission of the first information may comprise initiating transmission of a first service operation request and the first service operation request may comprise the first information.

In some embodiments, the first service operation request may be an Npcf_AMPolicyAuthorization_Subscribe request or an Npcf_EventExposure_Subscribe request. Herein, an Npcf_AMPolicyAuthorization_Subscribe request can be a request for the first network function to (e.g. explicitly) subscribe to the notification of events, e.g. any events related to the UE or, more specifically, the subscription permanent identifier (SUPI) for the UE. Herein, an Npcf_EventExposure_Subscribe can be a request to subscribe the first network function for event notifications, e.g. on a specified policy control event for the UE.

In some embodiments, the first information may be an event identifier for the notification of the change in the PDUID for the UE.

In some embodiments, the method may comprise receiving at least one updated PDUID for the UE from the second network function.

In some embodiments, the method may comprise receiving the at least one updated PDUID for the UE in response to the at least one updated PDUID being generated for the UE.

In some embodiments, the method may comprise receiving the at least one updated PDUID for the UE with an indication that the notification of the change in the PDUID for the UE has been met.

In some embodiments, the method may comprise initiating transmission of second information towards the second network function, wherein the second information may be indicative that the first network function is to be unsubscribed from receiving the notification.

In some embodiments, initiating transmission of the second information may comprise initiating transmission of a second service operation request and the second service operation request may comprise the second information.

In some embodiments, the second service operation request may be an Npcf_AMPolicyAuthorization_Unsubscribe request or an Npcf_EventExposure_Unsubscribe request. Herein, an Npcf_AMPolicyAuthorization_Unsubscribe request can be a request for the first network function to (e.g. explicitly) unsubscribe from the notification of events, e.g. any events related to the UE or, more specifically, the subscription permanent identifier (SUPI) for the UE. The events can be those related to the Npcf_AMPolicyAuthorization_Subscribe request mentioned earlier. Herein, an Npcf_EventExposure_Unsubscribe request can be a request to unsubscribe the first network function from event notifications. The event notifications can be those related to the Npcf_EventExposure_Subscribe mentioned earlier.

In some embodiments, transmission of the first information may be initiated in response to receiving a discovery request from the UE (wherein the discovery request can be a request for a restricted discovery code) and/or the first network function not having a UE context for the UE. A UE context can refer to information associated to the UE. The information can, for example, comprise state information for the UE, security information for the UE, capability information for the UE, the identities of one or more logical connections for the UE, and/or any other information associated to the UE. The information can comprise information required to maintain one or more services towards the UE.

In some embodiments, the method may comprise initiating transmission of the first information with a subscription permanent identifier (SUPI) for the UE.

In some embodiments, the method may comprise receiving the PDUID for the UE with an associated expiration timer.

In some embodiments, the first network function may be a direct discovery name management function (DDNMF) and/or the second network function may be a policy control function (PCF).

Figure 4:
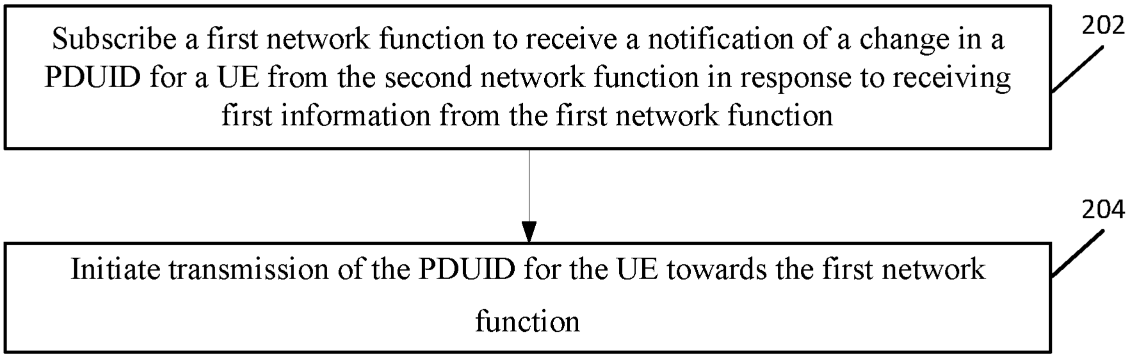
FIG. 4 is a flow chart illustrating a method performed by a second network function according to an embodiment.

FIG. 4 is a block diagram illustrating a method of operating a second network function in a communication network according to an embodiment. Herein, the second network function may also be referred to as a second network function node. The method can be performed by or under the control of processing circuitry of the second network function. As illustrated by block 202 of FIG. 4, a first network function is subscribed to receive a notification of a change in a PDUID for a UE from the second network function in response to receiving first information from the first network function. The first information is indicative that the first network function is to be subscribed to receive the notification. As illustrated by block 204 of FIG. 4, transmission of the PDUID for the UE is initiated towards the first network function.

In some embodiments, receiving the first information may comprise receiving a first service operation request and the first service operation request comprises the first information.

In some embodiments, the first service operation request may be an Npcf_AMPolicyAuthorization_Subscribe request or an Npcf_EventExposure_Subscribe request.

In some embodiments, the first information may be an event identifier for the notification of the change in the PDUID for the UE.

In some embodiments, the method may comprise initiating transmission of at least one updated PDUID for the UE towards the first network function.

In some embodiments, transmission of the at least one updated PDUID for the UE may be initiated in response to the at least one updated PDUID being generated for the UE.

In some embodiments, the method may comprise initiating transmission of the at least one updated PDUID for the UE with an indication that the notification of the change in the PDUID for the UE has been met.

In some embodiments, the method may comprise unsubscribing the first network function from receiving the notification in response to receiving second information from the first network function, wherein the second information may be indicative that the first network function is to be unsubscribed from receiving the notification.

In some embodiments, receiving the second information may comprise receiving a second service operation request and the second service operation request comprises the second information.

In some embodiments, the second service operation request may be an Npcf_AMPolicyAuthorization_Unsubscribe request or an Npcf_EventExposure_Unsubscribe request.

In some embodiments, the first information may be received in response to a discovery request from the UE (wherein the discovery request can be a request for a restricted discovery code) and/or the first network function not having a UE context for the UE.

In some embodiments, the first information may be received with a subscription permanent identifier (SUPI) for the UE.

In some embodiments, the method may comprise initiating transmission of the PDUID for the UE with an associated expiration timer.

In some embodiments, the first network function may be a direct discovery name management function (DDNMF) and/or the second network function is a policy control function (PCF).

In some embodiments, the 5G DDNMF may retrieve the PDUID and subscribe/unsubscribe to notifications of the change of PDUID from the PCF. In some embodiments, the PCF may offer a new event to consumers for a Npcf_AMPolicyAuthorization or Npcf_EventExposure service. The event may be a "PDUID change". The PCF may report the PDUID to the consumer, i.e. 5G DDNMF until the subscription is terminated.

The PCF may offer an event ID as follows. Some embodiments provide that the event may be the PDUID change notification. In some embodiments, the event may not be available for bulk subscription.

Some embodiments provide that the Npcf_AMPolicyAuthorization service may be used. For example, the 5G DDNMF may receive a Discovery Request from UE to ask for a restricted discovery code. For example, the request may be made via a PC3 or PC3a interface. If the 5G DDNMF does not have the UE context for this UE, it may subscribe to notifications of the PDUID change to the PCF. Some embodiments provide that a Npcf_AMPolicyAuthorization_Create/Subscribe Request is used to subscribe to the notifications of the PDUID change to the PCF and includes the "PDUID change notification" and optionally also the subscription permanent identifier (SUPI), which can be a mandatory parameter according to some embodiments.

The PCF may provide the currently allocated PDUID to the 5G DDNMF in the Npcf_AMPolicyAuthorization_Subscribe Response.

At the time the PCF generates a new PDUID, then a Npcf_AMPolicyAuthorization_Notify message can be sent to the 5G DDNMF including the indication that the Event "PDUID change notification" is met and the new PDUID. Herein, the Npcf_AMPolicyAuthorization_Notify message can be a message that notifies the first network function (e,g. the 5G DDNMF) of subscribed events.

In some embodiments, the 5G DDNMF may unsubscribe from notifications of the PDUID change to the PCF using a Npcf_AMPolicyAuthorize_Unsubscribe Request, to terminate the association with the PCF and the subscription.

Some embodiments provide that the Npcf_EventExposure service is used. When the 5G DDNMF receives a Discovery Request from UE to ask restricted discovery code from PC3 (PC3a interface) and the 5G DDNMF does not have the UE context for this UE, it can subscribe to notifications of the PDUID change to the PCF. In some embodiments, subscribing to the notifications of the PDUID change to the PCF may use Npcf_EventExposure_Subscribe Request and may include the new Event "PDUID change notification" and optionally also the SUPI (which can be a mandatory parameter according to some embodiments). Some embodiments provide that the PCF can provide the currently allocated PDUID to the 5G DDNMF in the Npcf_EventExposure_Subscribe Response. Some embodiments provide that this service operation may allow a requesting event for a new SUPI.

In some embodiments, when the 5G DDNMF starts, it may call the Npcf_EventExposure_Subscribe Request, including the new event "PDUID change notification" and any UE. The PCF can provide the currently allocated PDUID(s) and corresponding SUPI(s) to the 5G DDNMF in the Npcf_EventExposure_Subscribe Response.

Some embodiments provide that, at the time the PCF generates a new PDUID for a UE, then the Npcf_EventExposure_Notify message may be sent to the 5G DDNMF including the indication that the Event "PDUID change notification" is met and the new PDUID. Herein, the Npcf_EventExposure_Notify message can be a message that reports events that the first network function (e.g. 5G DDNMF) has previously subscribed to.

Some embodiments provide that the 5G DDNMF may unsubscribe from the notification of the PDUID change to the PCF using an Npcf_EventExposure_Unsubscribe Request to cancel the subscription.

In some embodiments, the PDUID may be provided with an associated expiration timer.

Figure 5:
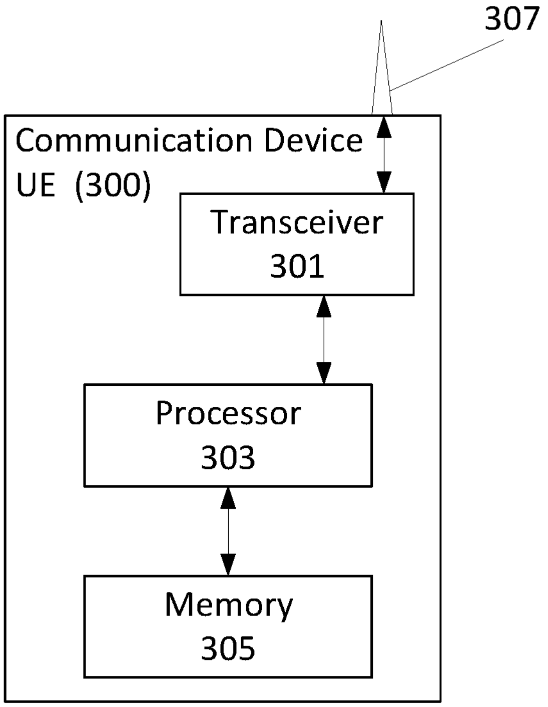
FIG. 5 is a block diagram illustrating a wireless device (e.g. UE) according to some embodiments of inventive concepts.

FIG. 5 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. Communication device 300 may be provided, for example, as discussed below with respect to wireless device 4110 of FIG. 11, UE 4200 of FIG. QQ2, UEs 4491, 4492 of FIG. QQ4, and/or UE 4530 of FIG. 15. As shown in FIG. 5, communication device UE 300 may include an antenna 307 (e.g., corresponding to antenna 4111 of FIG. 11), and transceiver circuitry 301 (also referred to as a transceiver, e.g., corresponding to interface 4114 of FIG. 11) including a transmitter and a receiver configured to provide uplink (UL) and downlink (DL) radio communications with a base station(s) (e.g., corresponding to network node 4160 of FIG. 11, also referred to as a RAN node) of a radio access network. Communication device UE 300 may also include processing circuitry 303 (also referred to as a processor, e.g., corresponding to processing circuitry 4120 of FIG. 11) coupled to the transceiver circuitry, and memory circuitry 305 (also referred to as memory, e.g., corresponding to device readable medium 4130 of FIG. 11) coupled to the processing circuitry 303. The memory circuitry 305 may include computer readable program code that when executed by the processing circuitry 303 causes the processing circuitry 303 to perform operations according to embodiments disclosed herein. According to other embodiments, processing circuitry 303 may be defined to include memory so that separate memory circuitry 305 is not required. Communication device UE 300 may also include an interface (such as a user interface) coupled with processing circuitry 303, and/or communication device UE 300 may be incorporated in a vehicle.

As discussed herein, operations of communication device UE 300 may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device UE 300 and/or an element(s)/function(s) thereof may be embodied as a virtual node/nodes and/or a virtual machine/machines.

Figure 6:
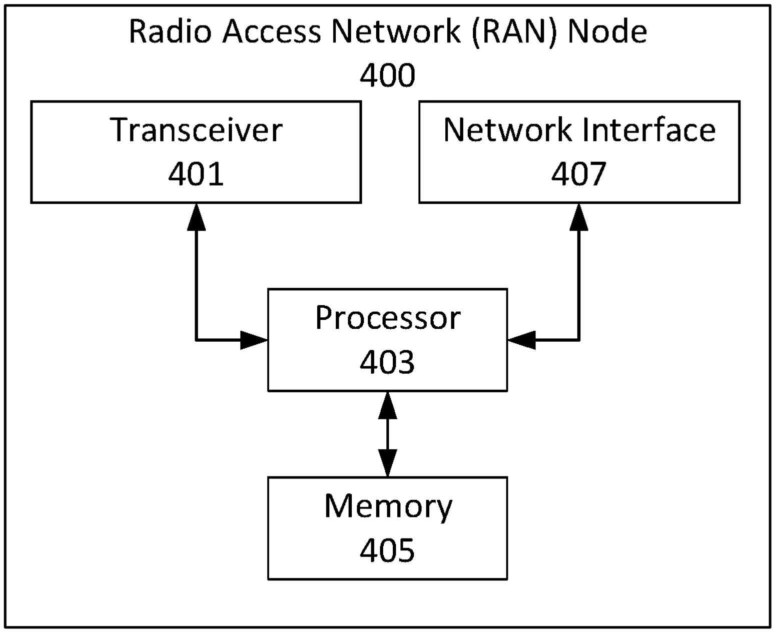
FIG. 6 is a block diagram illustrating a radio access network (RAN) node (e.g., a base station, such as an eNodeB (eNB) or a gNodeB (gNB)) according to some embodiments of inventive concepts.

FIG. 6 is a block diagram illustrating elements of a first network function or, more specifically, a first network function node 400. As mentioned earlier, in some embodiments, the first network function can be a DDNMF. As illustrated in FIG. 6, in some embodiments, the first network function can be a radio access network (RAN) node 400 (also referred to as a network node, base station, eNodeB (eNB), gNodeB (gNB), etc.) of a RAN configured to provide cellular communication according to embodiments of inventive concepts. RAN node 400 may be provided, for example, as discussed below with respect to network node 4160 of FIG. 11, base stations 4412*a*, 4412*b*, 4412*c* of FIG. 14, and/or base station 4520 of FIG. 15. As shown in FIG. 6, the RAN node may include transceiver circuitry 401 (also referred to as a transceiver, e.g., corresponding to portions of interface 4190 of FIG. 11) including a transmitter and a receiver configured to provide uplink and downlink radio communications with mobile terminals. The RAN node may include network interface circuitry 407 (also referred to as a network interface, e.g., corresponding to portions of interface 4190 of FIG. 11) configured to provide communications with other nodes (e.g., with other base stations) of the RAN and/or core network (CN). The network node may also include processing circuitry 403 (also referred to as a processor, e.g., corresponding to processing circuitry 4170) coupled to the transceiver circuitry 401, and memory circuitry 405 (also referred to as memory, e.g., corresponding to device readable medium 4180 of FIG. 11) coupled to the processing circuitry 403. The memory circuitry 405 may include computer readable program code that when executed by the processing circuitry 403 causes the processing circuitry 403 to perform operations according to embodiments disclosed herein. According to other embodiments, processing circuitry 403 may be defined to include memory so that a separate memory circuitry 405 is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface 407 from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 7:
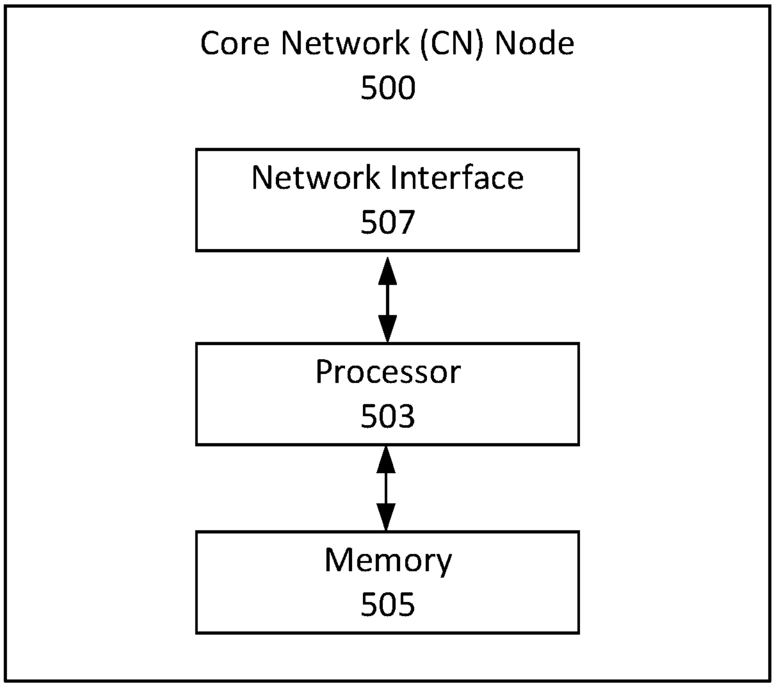
FIG. 7 is a block diagram illustrating a core network (CN) node (e.g., an access and mobility management function (AMF) node, a session management function (SMF) node, etc.) according to some embodiments of inventive concepts.

FIG. 7 is a block diagram illustrating elements of a second network function or, more specifically, a second network function node 500. As mentioned earlier, in some embodiments, the second network function can be a PCF. As illustrated in FIG. 7, in some embodiments, the second network function can be a CN node (e.g., an SMF node, an AMF node, etc.) 500 of a communication network configured to provide cellular communication according to embodiments of inventive concepts. As shown, the CN node 500 may include network interface circuitry 507 (also referred to as a network interface) configured to provide communications with other nodes of the core network and/or the RAN. The CN node may also include a processing circuitry 503 (also referred to as a processor) coupled to the network interface circuitry 507, and memory circuitry 505 (also referred to as memory) coupled to the processing circuitry 503. The memory circuitry 505 may include computer readable program code that when executed by the processing circuitry 503 causes the processing circuitry 503 to perform operations according to embodiments disclosed herein. According to other embodiments, processing circuitry 503 may be defined to include memory so that a separate memory circuitry 505 is not required.

As discussed herein, operations of the CN node 500 may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry 507 from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

Operations of the communication device 300 (implemented using the structure of the block diagram of FIG. 5) are configured to perform some operations disclosed herein. For example, modules may be stored in memory 305 of FIG. 5, and these modules may provide instructions so that when the instructions of a module are executed by respective communication device processing circuitry 303, processing circuitry 303 performs respective operations disclosed herein.

Operations of a RAN node 400 may be implemented using the structure of FIG. 6 according to some embodiments of inventive concepts. For example, modules may be stored in memory 405 of FIG. 6, and these modules may provide instructions so that when the instructions of a module are executed by respective RAN node processing circuitry 403, processing circuitry 403 performs respective operations of the flow chart.

Operations of a CN node 500 may be implemented using the structure of FIG. 7 according to some embodiments of inventive concepts. For example, modules may be stored in memory 505 of FIG. 7, and these modules may provide instructions so that when the instructions of a module are executed by respective CN node processing circuitry 503, processing circuitry 503 performs respective operations of the flow chart.

According to an aspect of the disclosure, there is provided a system. The system can comprise at least one first network function as described herein and at least one second network function as described herein. A method performed by the system can comprise the method described herein in respect of the first network function and the method described herein in respect of the second network function.

Figure 8:
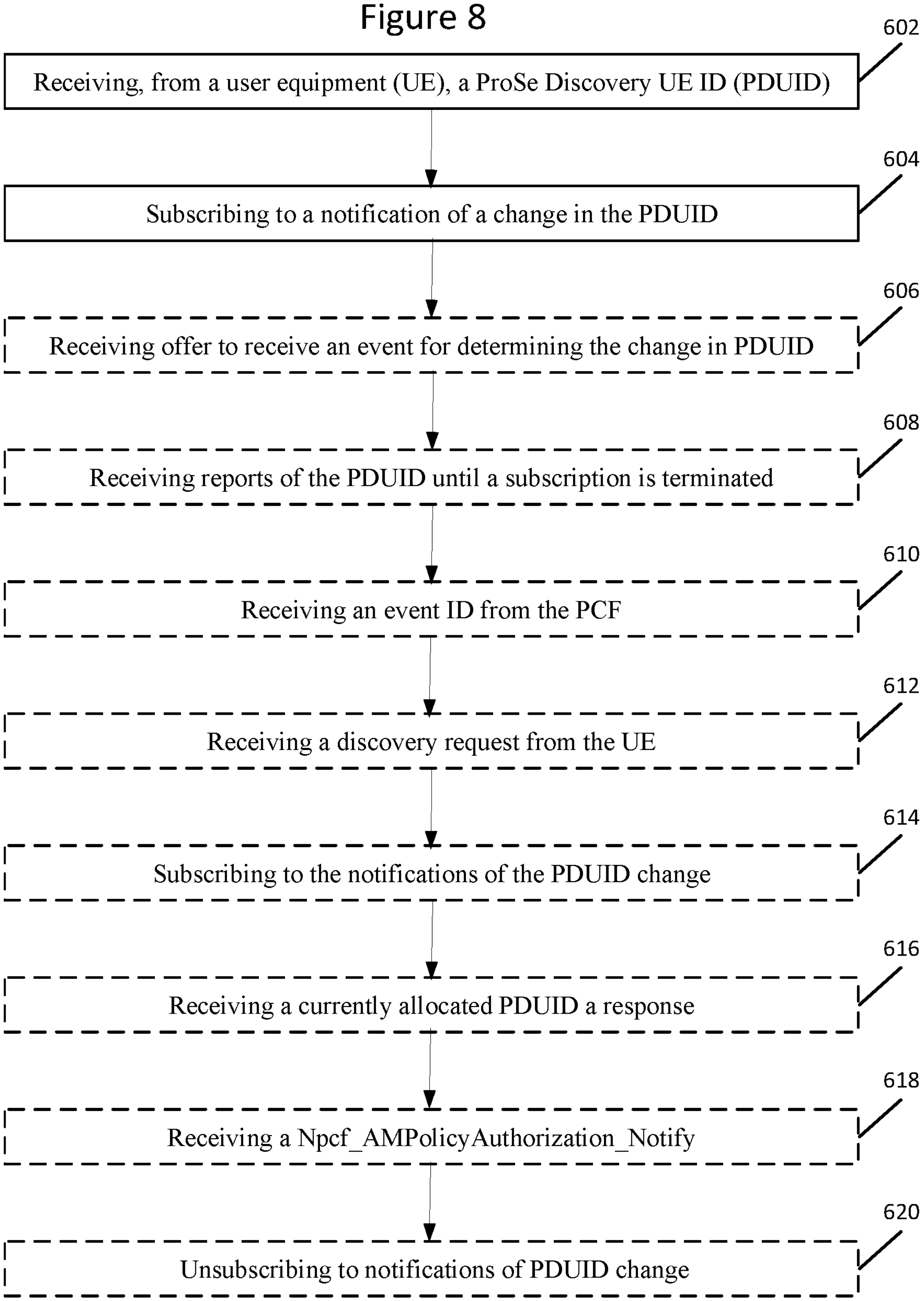
FIG. 8 is a flow chart illustrating operations according to some embodiments of inventive concepts.

Reference is now made to FIG. 8, which is a flow chart illustrating operations according to some embodiments of inventive concepts. Some embodiments provide operations for methods of operating a communication device in a communication network. Such operations include receiving (block 602), from a UE, a PDUID. Operations may include subscribing (block 604) to a notification of a change in the PDUID from a PCF.

Some embodiments include receiving (block 606), from the PCF, an offer to receive an event for determining the change in PDUID. In some embodiments, the new event comprises a Npcf_AMPolicy_Authorization or a Npcf_Event Exposure service. In some embodiments, the event comprises a PDUID change.

Operations may include receiving (block 608) reports of the PDUID until a subscription is terminated. Operations may further include receiving (block 610) an event ID from the PCF. In some embodiments, the event comprises the PDUID change notification. Some embodiments provide that the event is not available for bulk subscription.

Some embodiments include receiving (block 612) a discovery request from the UE. In some embodiments, the discovery request includes a request for a restricted discovery code.

In some embodiments, responsive to not having a UE context that corresponds to the UE, operations further include subscribing (block 614) to the notifications of the PDUID change by sending an Npcf_AMPolicyAuthorization_Create/Subscribe request. In some embodiments, the request includes the PDUID change notification and a SUPI.

Operations may include receiving (block 616), from the PCF, a currently allocated PDUID in a Npcf_AMPolicyAuthorization_Create/Subscribe response. Some embodiments provide that, in response to the PCF generating a new PDUID, operations include receiving (block 618), from the PCF, a Npcf_AMPolicyAuthorization_Notify that includes an indication that an event PDUID change notification is met and a new PDUID.

Some embodiments include unsubscribing (block 620) to notifications of PDUID change using a Npcf_AMPolicyAuthorize_Delete/Unsubscribe to terminate an association with the PCF and the subscription.

Figure 9:
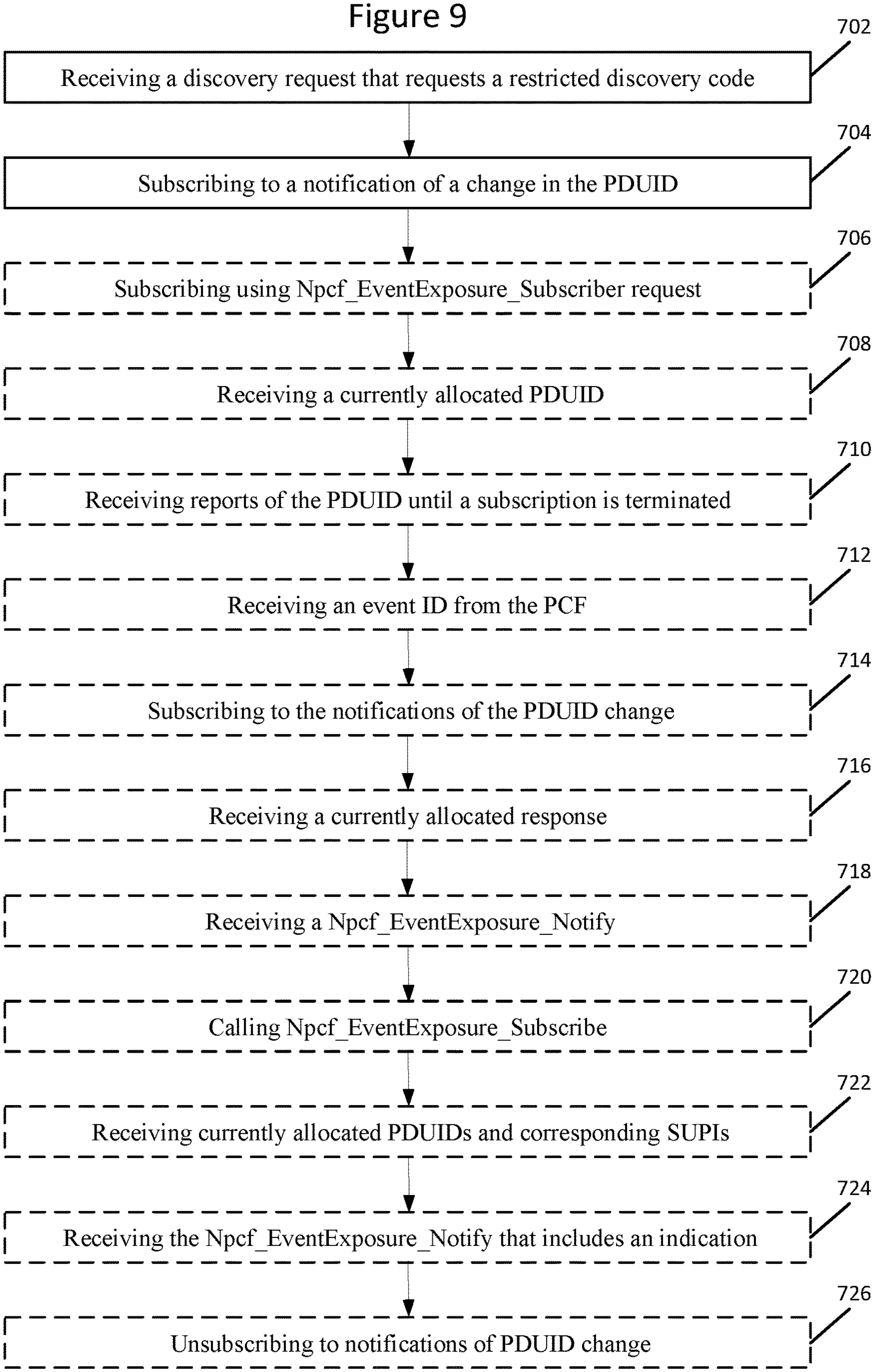
FIG. 9 is a flow chart illustrating operations according to some embodiments of inventive concepts.

Reference is now made to FIG. 9, which is a flow chart illustrating operations according to some embodiments of inventive concepts for methods of operating a communication device in a communication network. Operations according to such methods may include receiving (block 702), from a UE, a discovery request that requests a restricted discovery code and, responsive to not having a UE context, subscribing (block 704) to a notification of a change in the PDUID from a PCF.

In some embodiments, subscribing includes subscribing (block 706) using Npcf_EventExposure_Subscribe request.

Some embodiments include receiving (block 708), from the PCF, a currently allocated PDUID in a Npcf_EventExposure_Subscribe response.

In some embodiments, operations include receiving (block 710) reports of the PDUID until a subscription is terminated.

Some embodiments include receiving (block 712) an event ID from the PCF. Some embodiments provide that the event comprises the PDUID change notification.

In some embodiments, responsive to not having a UE context that corresponds to the UE, operations further include subscribing (block 714) to the notifications of the PDUID change by sending an Npcf_EventExposure_Subscribe request. In some embodiments, the request comprises the PDUID change notification and a SUPI.

Some embodiments include receiving (block 716), from the PCF, a currently allocated PDUID in a Npcf_EventExposure/Subscribe response. In some embodiments, responsive to the PCF generating a new PDUID, operations include receiving (block 718), from the PCF, a Npcf_EventExposure_Notify that includes an indication that an event PDUID change notification is met and a new PDUID.

Some embodiments include calling (block 720) Npcf_EventExposure_Subscribe including a new event PDUID change notification and any of a plurality of UEs.

Some embodiments include receiving (block 722), from the PCF, currently allocated PDUIDs and corresponding SUPIs in the Npcf_EventExposure_subscribe response.

In some embodiments, in response to the PCF generating a new PDUID for a UE, operations further include receiving (block 724) the Npcf_EventExposure_Notify that includes an indication that the PDUID change notification is met and the new PDUID.

Some embodiments include unsubscribing (block 726) to notifications of PDUID change using a Npcf_EventExposure_Unsubscribe to terminate an association with the PCF and the subscription.

Figure 10:
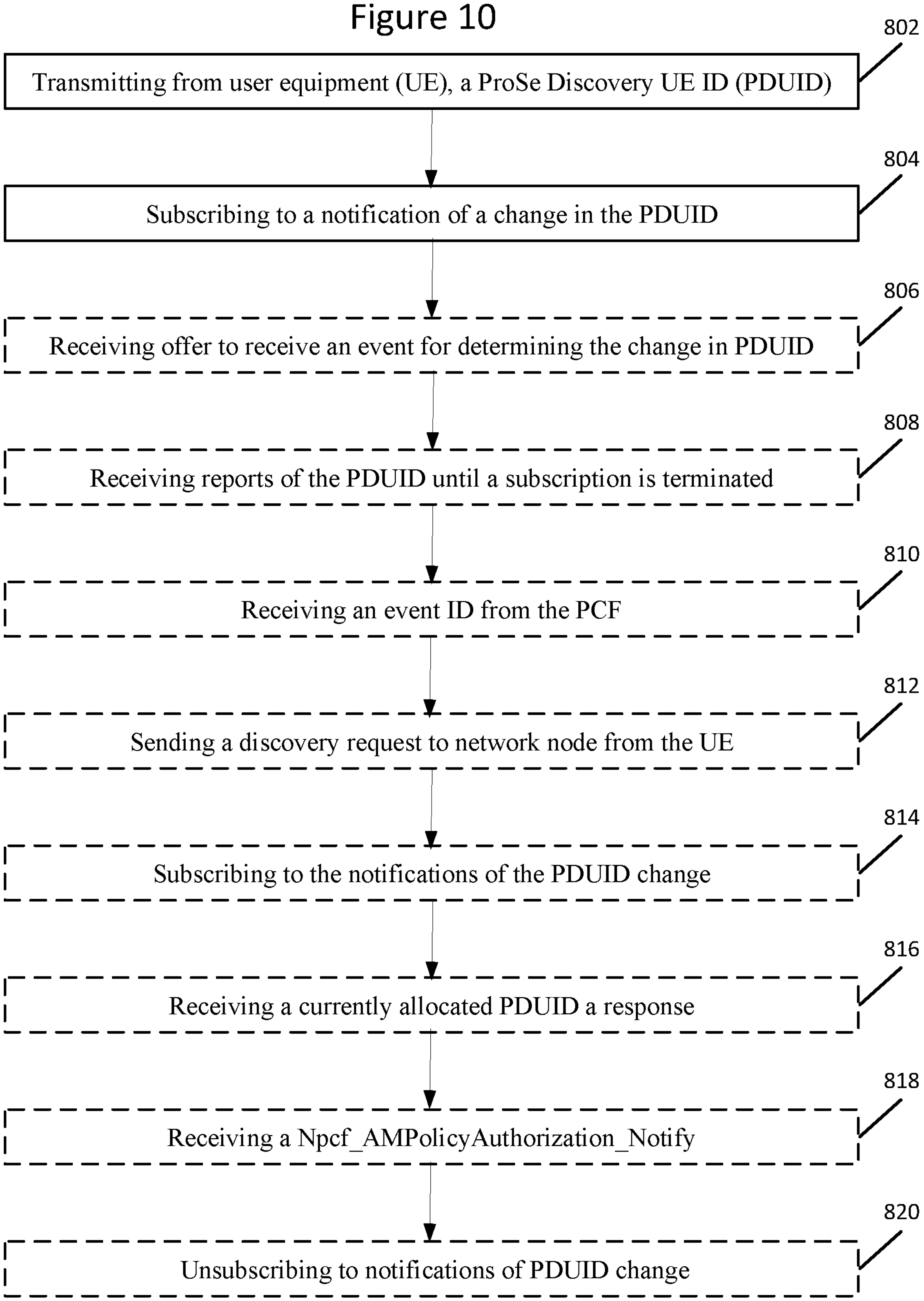
FIG. 10 is a flow chart illustrating operations according to some embodiments of inventive concepts.

Reference is now made to FIG. 10, which is a flow chart illustrating operations according to some embodiments of inventive concepts. Some embodiments provide operations for methods of operating a communication device in a communication network. Such operations include transmitting (block 802), from a UE, a PDUID. Operations may include subscribing (block 804) to a notification of a change in the PDUID from a PCF.

Some embodiments include receiving (block 806), from the PCF, an offer to receive an event for determining the change in PDUID. In some embodiments, the new event comprises a Npcf_AMPolicy_Authorization or a Npcf_Event Exposure service. In some embodiments, the event comprises a PDUID change.

Operations may include receiving (block 808) reports of the PDUID until a subscription is terminated. Operations may further include receiving (block 810) an event ID from the PCF. In some embodiments, the event comprises the PDUID change notification. Some embodiments provide that the event is not available for bulk subscription.

Some embodiments include sending (block 812) a discovery request from the UE. In some embodiments, the discovery request includes a request for a restricted discovery code.

In some embodiments, responsive to not having a UE context that corresponds to the UE, operations further include subscribing (block 814) to the notifications of the PDUID change by sending an Npcf_AMPolicyAuthorization_Create/Subscribe request. In some embodiments, the request includes the PDUID change notification and a SUPI.

Operations may include receiving (block 816), from the PCF, a currently allocated PDUID in a Npcf_AMPolicyAuthorization_Create/Subscribe response. Some embodiments provide that, in response to the PCF generating a new PDUID, operations include receiving (block 818), from the PCF, a Npcf_AMPolicyAuthorization_Notify that includes an indication that an event PDUID change notification is met and a new PDUID.

Some embodiments include unsubscribing (block 820) to notifications of PDUID change using a Npcf_AMPolicyAuthorize_Delete/Unsubscribe to terminate an association with the PCF and the subscription.

Example embodiments are discussed below.

1. A method of operating a communication device in a communication network, the method comprising:
   receiving, from a user equipment (UE), a ProSe Discovery UE ID (PDUID); and
   subscribing to a notification of a change in the PDUID from a policy control function (PCF).
2. The method of embodiment 1, further comprising receiving, from the PCF, an offer to receive an event for determining the change in PDUID.
3. The method of embodiment 2, wherein the new event comprises a Npcf_AMPolicy_Authorization or a Npcf_Event Exposure service.
4. The method of any of embodiments 2-3, wherein the event comprises a PDUID change.
5. The method of any of embodiments 1-4, further comprising receiving reports of the PDUID until a subscription is terminated.
6. The method of any of embodiments 1-5, further comprising receiving an event ID from the PCF,
   wherein the event comprises the PDUID change notification.
7. The method of embodiment 6, wherein the event is not available for bulk subscription.

8 The method of any of embodiments 1-7, further comprising receiving a discovery request from the UE, wherein the discovery request comprises a request for a restricted discovery code.

9 The method of embodiment 8, wherein responsive to not having a UE context that corresponds to the UE, operations further comprise subscribing to the notifications of the PDUID change by sending an Npcf_AMPolicyAuthorization_Create/Subscribe request.

10. The method of embodiment 9, wherein the request comprises the PDUID change notification and a subscription permanent identifier (SUPI).

11. The method of any of embodiments 1-10, further comprising receiving, from the PCF, a currently allocated PDUID in a Npcf_AMPolicyAuthorization_Create/Subscribe response.

12. The method of any of embodiments 1-11, responsive to the PCF generating a new PDUID, receiving, from the PCF, a Npcf_AMPolicyAuthorization_Notify that includes an indication that an event PDUID change notification is met and a new PDUID.

13. The method of any of embodiments 1-12, further comprising unsubscribing to notifications of PDUID change using a Npcf_AMPolicyAuthorize_Delete/Unsubscribe to terminate an association with the PCF and the subscription.

14. A communication device (300) comprising:

processing circuitry (303); and memory (305) coupled with the processing circuitry, wherein the memory includes instructions that when executed by the processing circuitry causes the communication device to perform operations according to any of Embodiments 1-13.

15. A communication device (300) adapted to perform according to any of embodiments 1-13.

16. A computer program comprising program code to be executed by processing circuitry (303) of a communication device (300), whereby execution of the program code causes the communication device (300) to perform operations according to any of embodiments 1-13.

17. A computer program product comprising a non-transitory storage medium including program code to be executed by processing circuitry (303) of a communication device (300), whereby execution of the program code causes the communication device (300) to perform operations according to any of embodiments 1-13.

18. A method of operating a radio access network node, RAN, in a communication network, the method comprising:

receiving, from a user equipment (UE), a ProSe Discovery UE ID (PDUID); and subscribing to a notification of a change in the PDUID from a policy control function (PCF).

19. The method of embodiment 18, further comprising receiving, from the PCF, an offer to receive an event for determining the change in PDUID.

20. The method of embodiment 19, wherein the new event comprises a Npcf_AMPolicy_Authorization or a Npcf_Event Exposure service.

21. The method of any of embodiments 19-20, wherein the event comprises a PDUID change.

22. The method of any of embodiments 18-21, further comprising receiving reports of the PDUID until a subscription is terminated.

23. The method of any of embodiments 18-22, further comprising receiving an event ID from the PCF, wherein the event comprises the PDUID change notification.

24. The method of embodiment 23, wherein the event is not available for bulk subscription.

25. The method of any of embodiments 18-24, further comprising receiving a discovery request from the UE, wherein the discovery request comprises a request for a restricted discovery code.

26. The method of embodiment 25, wherein responsive to not having a UE context that corresponds to the UE, operations further comprise subscribing to the notifications of the PDUID change by sending an Npcf_AMPolicyAuthorization_Create/Subscribe request.

27. The method of embodiment 26, wherein the request comprises the PDUID change notification and a subscription permanent identifier (SUPI).

28. The method of any of embodiments 18-27, further comprising receiving, from the PCF, a currently allocated PDUID in a Npcf_AMPolicyAuthorization_Create/Subscribe response.

29. The method of any of embodiments 18-28, responsive to the PCF generating a new PDUID, receiving, from the PCF, a Npcf_AMPolicyAuthorization_Notify that includes an indication that an event PDUID change notification is met and a new PDUID.

30. The method of any of embodiments 18-29, further comprising unsubscribing to notifications of PDUID change using a Npcf_AMPolicyAuthorize_Delete/Unsubscribe to terminate an association with the PCF and the subscription.

31. A radio access network, RAN, node (400) comprising:

processing circuitry (403); and memory (405) coupled with the processing circuitry, wherein the memory includes instructions that when executed by the processing circuitry causes the RAN node to perform operations according to any of Embodiments 18-30.

32. A radio access network, RAN, node (400) adapted to perform according to any of Embodiments 18-30.

33. A computer program comprising program code to be executed by processing circuitry (403) of a radio access network, RAN, node (400), whereby execution of the program code causes the RAN node (400) to perform operations according to any of embodiments 18-30.

34. A computer program product comprising a non-transitory storage medium including program code to be executed by processing circuitry (403) of a radio access network, RAN, node (400), whereby execution of the program code causes the RAN node (400) to perform operations according to any of embodiments 18-30.

35. A method of operating a communication device in a communication network, the method comprising:

receiving, from a user equipment (UE), a discovery request that requests a restricted discovery code; and responsive to not having a UE context, subscribing to a notification of a change in the PDUID from a policy control function (PCF).

36. The method of embodiment 35, wherein subscribing comprises subscribing using Npcf_EventExposure_Subscriber request.

37. The method of any of embodiments 35-36, further comprising receiving, from the PCF, a currently allocated PDUID in a Npcf_EventExposure_Subscribe response.

38. The method of any of embodiments 35-37, further comprising receiving reports of the PDUID until a subscription is terminated.

39. The method of any of embodiments 35-38, further comprising receiving an event ID from the PCF, wherein the event comprises the PDUID change notification.
40. The method of embodiment 8, wherein responsive to not having a UE context that corresponds to the UE, operations further comprise subscribing to the notifications of the PDUID change by sending an Npcf_EventExposure_Subscribe request.
41. The method of embodiment 40, wherein the request comprises the PDUID change notification and a subscription permanent identifier (SUPI).
42. The method of any of embodiments 35-41, further comprising receiving, from the PCF, a currently allocated PDUID in a Npcf_EventExposure_/Subscribe response.
43. The method of any of embodiments 35-42, responsive to the PCF generating a new PDUID, receiving, from the PCF, a Npcf_EventExposure_Notify that includes an indication that an event PDUID change notification is met and a new PDUID.
44. The method of embodiment 35, further comprising calling Npcf_EventExposure_Subscribe including a new event PDUID change notification and any of a plurality of UEs.
45. The method of embodiment 44, further comprising receiving, from the PCF, currently allocated PDUIDs and corresponding SUPIs in the Npcf_EventExposure_subscribe response.
46. The method of embodiment 35, wherein in response to the PCF generating a new PDUID for a UE, operations further comprise receiving the Npcf_EventExposure_Notify that includes an indication that the PDUID change notification is met and the new PDUID.
47. The method of any of embodiments 35-46, further comprising unsubscribing to notifications of PDUID change using a Npcf_EventExposure_Unsubscribe to terminate an association with the PCF and the subscription.
48. A radio access network, RAN, node (400) comprising:
processing circuitry (403); and
memory (405) coupled with the processing circuitry, wherein the memory includes instructions that when executed by the processing circuitry causes the RAN node to perform operations according to any of Embodiments 35-47.
49. A radio access network, RAN, node (400) adapted to perform according to any of Embodiments 35-47.
50. A computer program comprising program code to be executed by processing circuitry (403) of a radio access network, RAN, node (400), whereby execution of the program code causes the RAN node (400) to perform operations according to any of embodiments 35-47.
51. A computer program product comprising a non-transitory storage medium including program code to be executed by processing circuitry (403) of a radio access network, RAN, node (400), whereby execution of the program code causes the RAN node (400) to perform operations according to any of embodiments 35-47.
52. A method of operating a communication device in a communication network, the method comprising:
transmitting, to a network node and by a user equipment (UE), a ProSe Discovery UE ID (PDUID); and
subscribing to a notification of a change in the PDUID from a policy control function (PCF).
53. The method of embodiment 52, further comprising receiving, from the PCF, an offer to receive an event for determining the change in PDUID.
54. The method of embodiment 53, wherein the new event comprises a Npcf_AMPolicy_Authorization or a Npcf_Event Exposure service.
55. The method of any of embodiments 53 54, wherein the event comprises a PDUID change.
56. The method of any of embodiments 52-55, further comprising receiving reports of the PDUID until a subscription is terminated.
57. The method of any of embodiments 52-565, further comprising receiving an event ID from the PCF, wherein the event comprises the PDUID change notification.
58. The method of embodiment 57, wherein the event is not available for bulk subscription.
59. The method of any of embodiments 52-59, further comprising sending a discovery request to the network node and from the UE, wherein the discovery request comprises a request for a restricted discovery code.
60. The method of embodiment 59, wherein responsive to not having a UE context that corresponds to the UE, operations further comprise subscribing to the notifications of the PDUID change by sending an Npcf_AMPolicyAuthorization_Create/Subscribe request.
61. The method of embodiment 60, wherein the request comprises the PDUID change notification and a subscription permanent identifier (SUPI).
62. The method of any of embodiments 52-61, further comprising receiving, from the PCF, a currently allocated PDUID in a Npcf_AMPolicyAuthorization_Create/Subscribe response.
63. The method of any of embodiments 52-62, responsive to the PCF generating a new PDUID, receiving, from the PCF, a Npcf_AMPolicyAuthorization_Notify that includes an indication that an event PDUID change notification is met and a new PDUID.
64. The method of any of embodiments 52-64, further comprising unsubscribing to notifications of PDUID change using a Npcf_AMPolicyAuthorize_Delete/Unsubscribe to terminate an association with the PCF and the subscription.

References are Identified Below.

3GPP TS 23.304 v 0.1.0. Proximity based Services (ProSe) in the 5G System (5GS)
3GPP TS 23.502 v.17.0.0. Procedures for the 5G System (5GS)
3GPP TS 23.503 v.17.0.0. Policy and charging control framework for the 5G System (5GS)

As provided herein, operation that may be performed by a RAN node may be performed using a core network node, among others.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
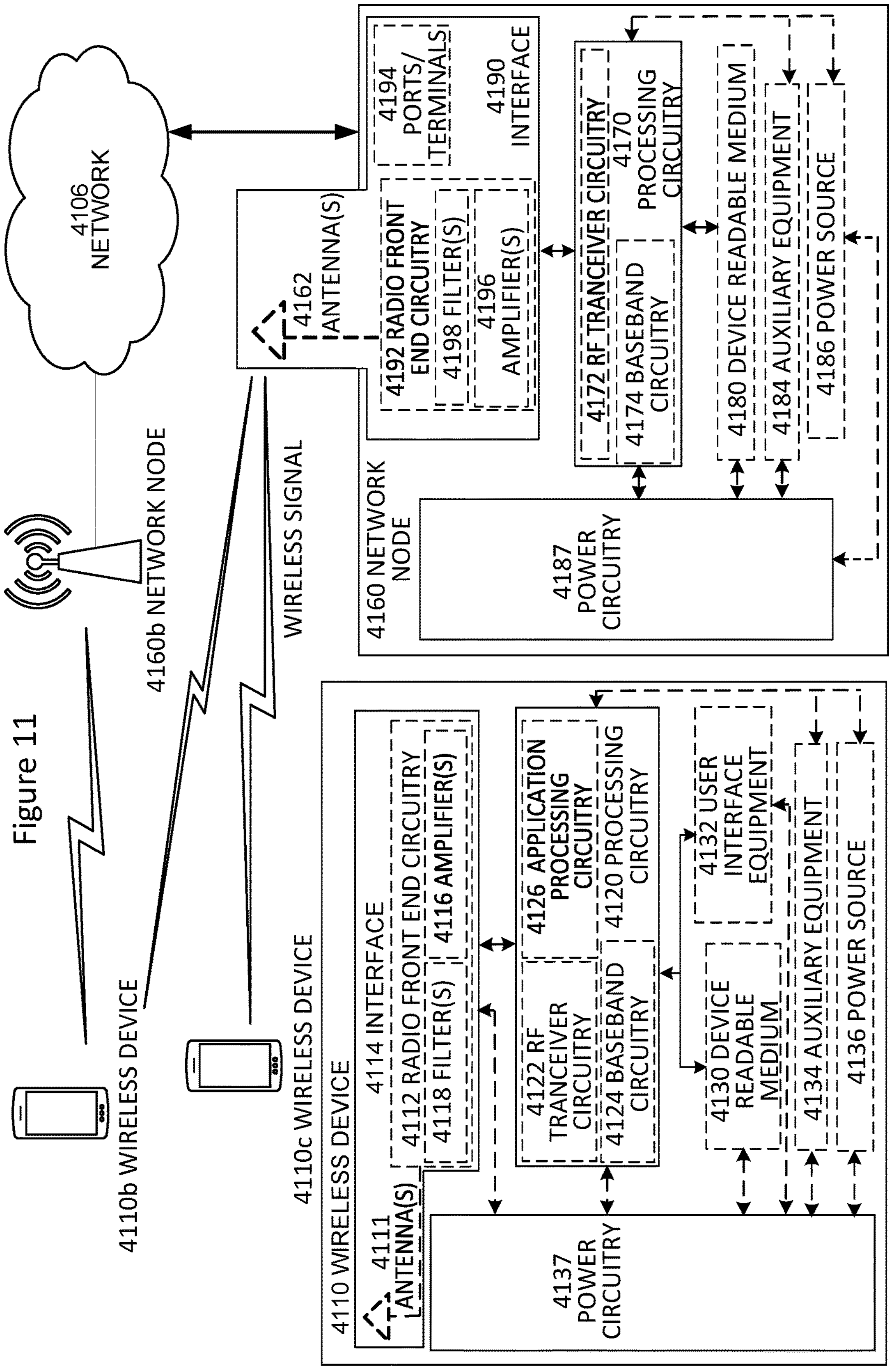
FIG. 11 is a block diagram of a wireless network in accordance with some embodiments.

FIG. 11 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 4106, network nodes 4160 and 4160*b*, and wireless devices (WDs) 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the Institute of Electrical and Electronics Engineers (IEEE) 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., mobile switching centers (MSCs), mobile management entities (MMEs)), operation and maintenance (O&M) nodes, operation support system (OSS) nodes, self-optimized network (SON) nodes, positioning nodes (e.g., evolved serving mobile location centers (E-SMLCs)), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple random access memory (RAM) modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different radio access technologies (RATs)) and some components may be reused (e.g., the same antenna 4162 may be shared by the RATs). Network node 4160 may also include multiple sets of the various illustrated components for different wireless technologies integrated into network node 4160, such as, for example, GSM, wide code division multiplexing access (WCDMA), LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, RAM, read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight (LOS) antenna used to transmit/receive radio signals in a relatively straight line. In some instances, the use of more than one antenna may be referred to as multiple-input and multiple-output (MIMO). In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 11 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IOT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine type communications (MTC) device. As one particular example, the WD may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a universal serial bus (USB) port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 12:
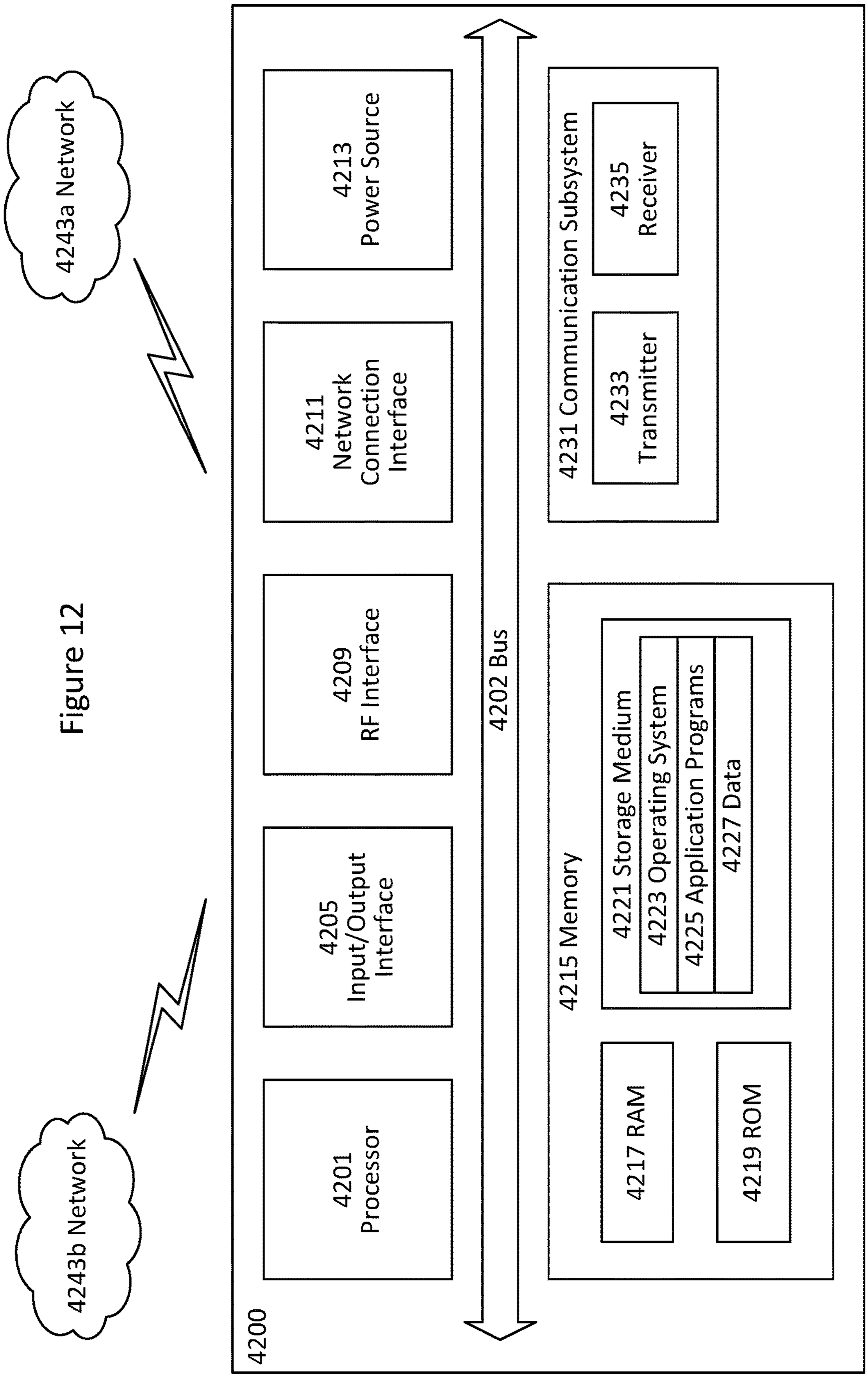
FIG. 12 is a block diagram of a user equipment in accordance with some embodiments.

FIG. 12 illustrates a UE in accordance with some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IOT UE, a machine type communication (MTC) UE, and/or an enhanced MTC (eMTC) UE. UE 4200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, field programmable gate array (FPGA), application specific integrated circuit (ASIC), etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, transmission control protocol (TCP)/internet protocol (IP), synchronous optical networking (SONET), asynchronous transfer mode (ATM), or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 12, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a RAN according to one or more communication protocols, such as IEEE 802.11, code division multiplexing access (CDMA), WCDMA, GSM, LTE, universal terrestrial radio access network (UTRAN), WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 13:
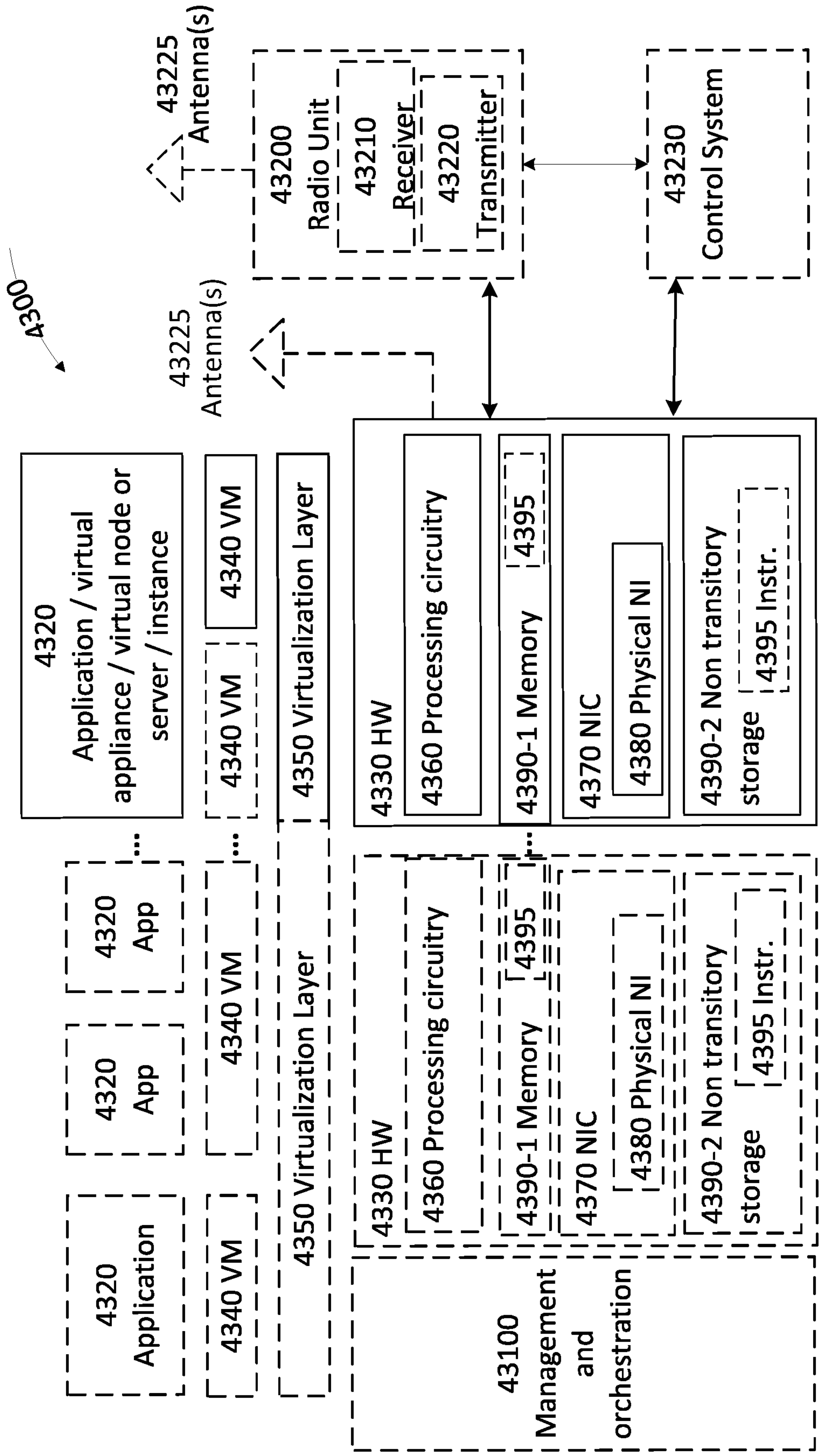
FIG. 13 is a block diagram of a virtualization environment in accordance with some embodiments.

FIG. 13 illustrates a virtualization environment in accordance with some embodiments.

FIG. 13 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 13, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network element (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 13.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 14:
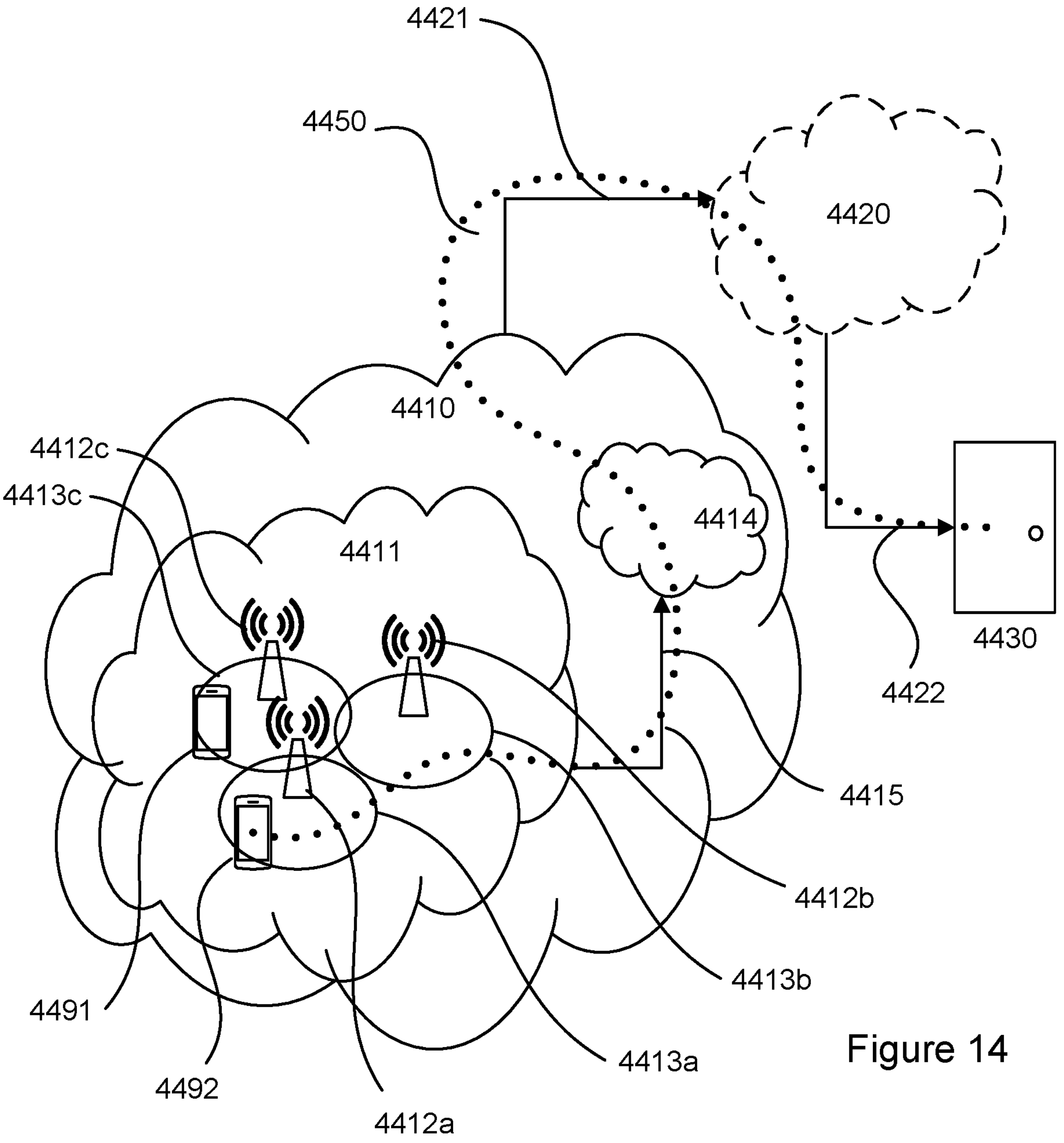
FIG. 14 is a block diagram of a telecommunication network connected via an intermediate network to a host computer in accordance with some embodiments.

FIG. 14 illustrates a telecommunication network connected via an intermediate network to a host computer in accordance with some embodiments.

With reference to FIG. 14, in accordance with an embodiment, a communication system includes telecommunication network 4410, such as a 3GPP-type cellular network, which comprises access network 4411, such as a radio access network, and core network 4414. Access network 4411 comprises a plurality of base stations **4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412**.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 14 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 15:
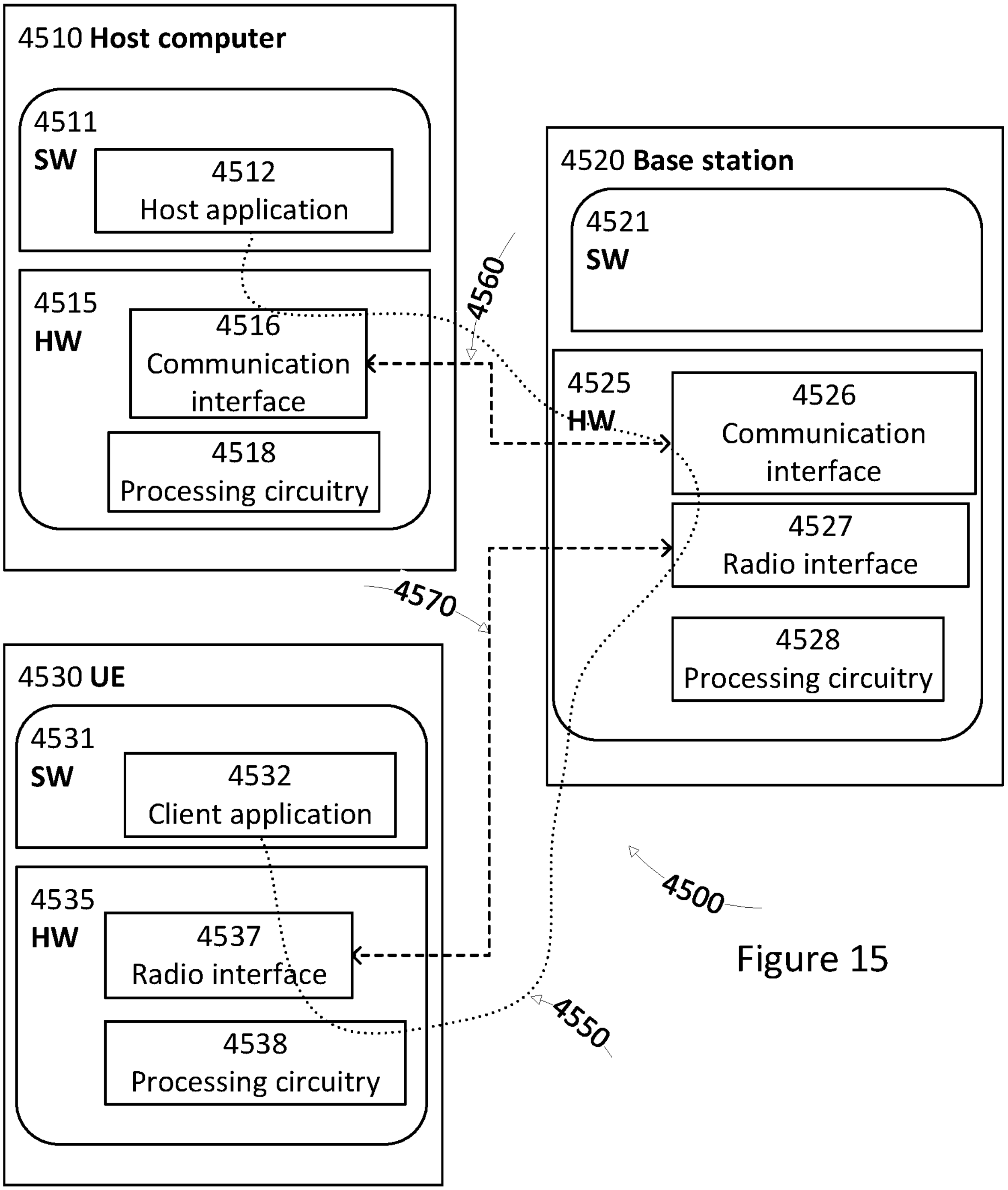
FIG. 15 is a block diagram of a host computer communicating via a base station with a user equipment over a partially wireless connection in accordance with some embodiments.

FIG. 15 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 15) served by base station 4520. Communication interface 4526 may be configured to facilitate connection 4560 to host computer 4510. Connection 4560 may be direct or it may pass through a core network (not shown in FIG. 15) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 15 may be similar or identical to host computer 4430, one of base stations 4412*a*, 4412*b*, 4412*c* and one of UEs 4491, 4492 of FIG. 14, respectively. This is to say, the inner workings of these entities may be as shown in FIG. 15 and independently, the surrounding network topology may be that of FIG. 14.

In FIG. 15, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 16:
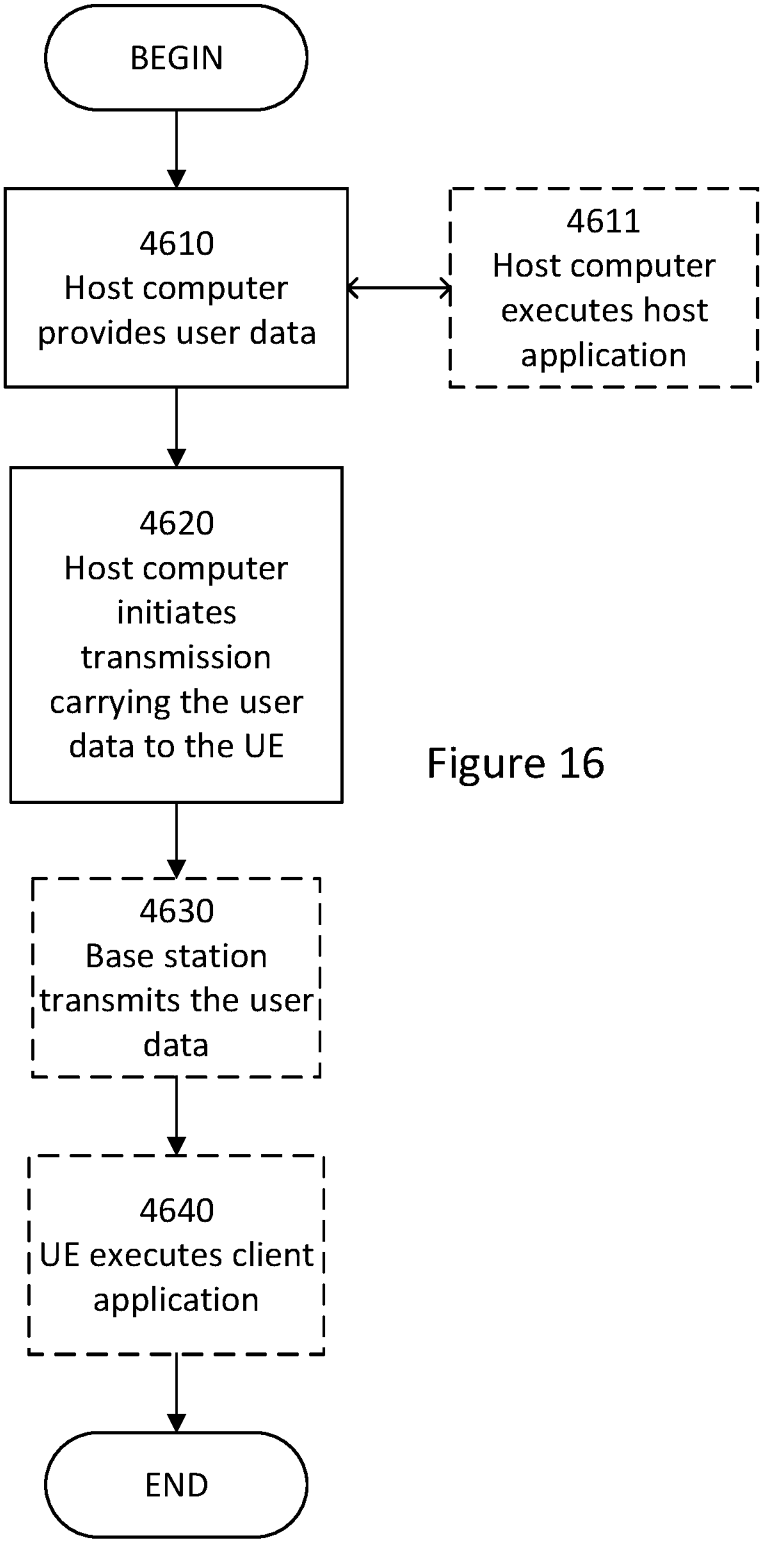
FIG. 16 is a block diagram of methods implemented in a communication system including a host computer, a base station and a user equipment in accordance with some embodiments.

FIG. 16 illustrates methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 17:
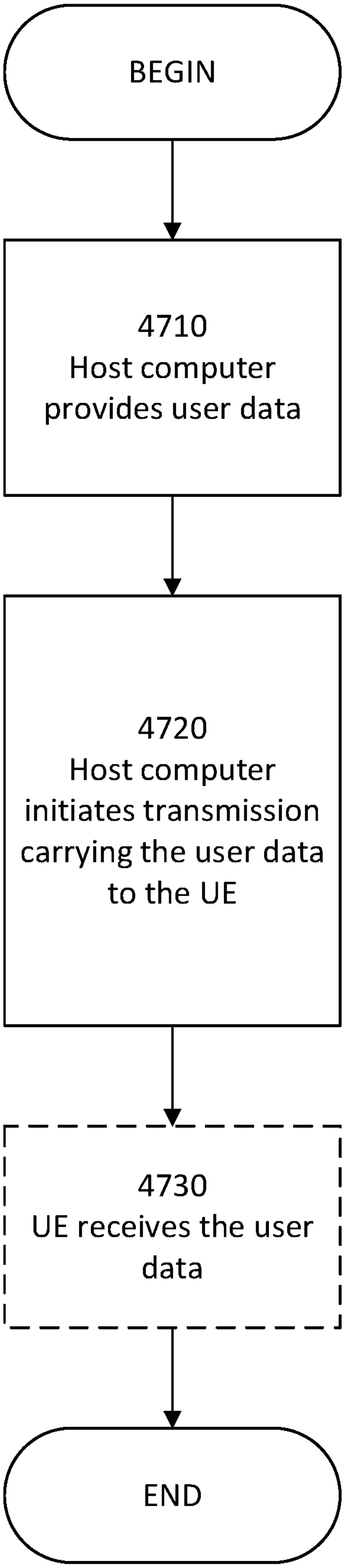
FIG. 17 is a block diagram of methods implemented in a communication system including a host computer, a base station and a user equipment in accordance with some embodiments.

FIG. 17 illustrates methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 18:
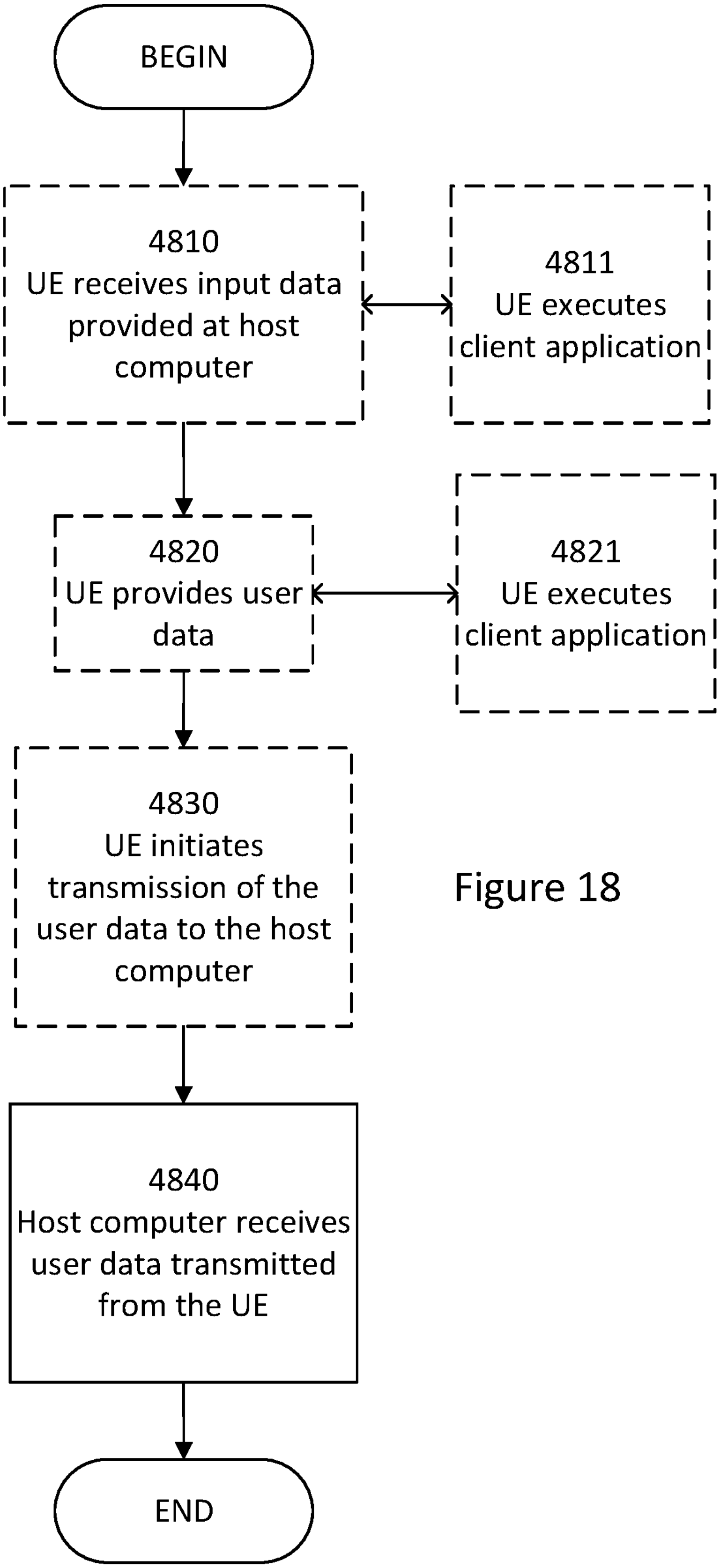
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 19:
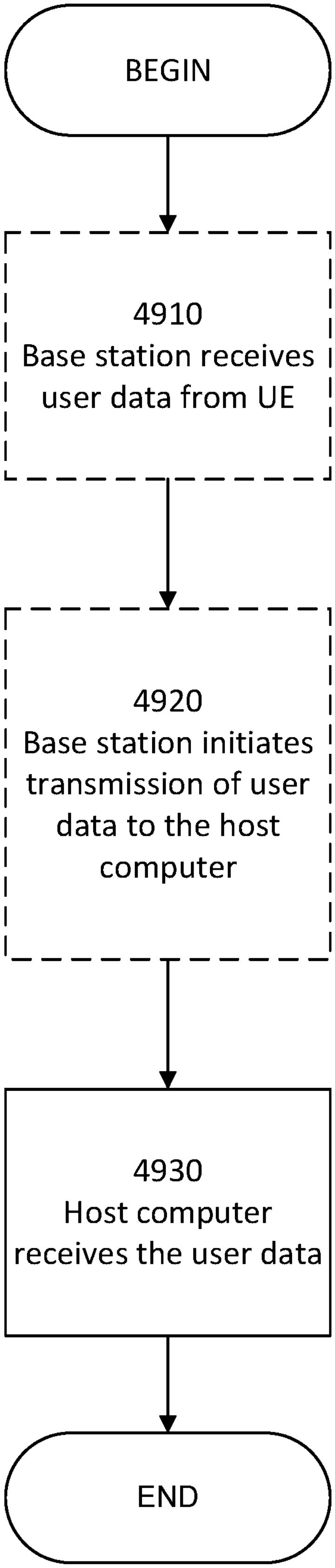
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
4G 4th Generation
5G 5th Generation
AMF Access and Mobility Management Function
AP Access Point
APN Access Point Name
ASIC Application Specific Integrated Circuit
ATM Asynchronous Transfer Mode
BS Base Station
BSC Base Station Controller
BTS Base Transceiver Station
CD Compact Disk
CDMA Code Division Multiplexing Access
COTS Commercial off-the-shelf
CPE Customer-premise equipment
CPU Central processing unit
D2D Device-to-device
DAS Distributed antenna system
DDNMF Direct Discovery Name Management Function
DIMM Dual in-line memory module
DL Downlink
DPF Direct Provisioning Function
DSP Digital Signal Processor
DVD Digital Video Disk
EEPROM Electrically erasable programmable read-only memory
eMTC Enhanced machine type communications
EPC Evolved Packet Core
EPROM Erasable programmable read-only memory
E-SMLC Evolved-Serving Mobile Location Centre
eNB E-UTRAN NodeB
E-SMLC evolved Serving Mobile Location Center
E-UTRA Evolved UTRA
E-UTRAN Evolved UTRAN
FPGA Field programmable gate array
gNB Base station in NR
GSM Global System for Mobile communication
GW Gateway
HDDS Holographic digital data storage
HD-DVD High-density digital versatile disc
HPLMN Home Public Land Mobile Network
HSS Home Subscriber Service
ID Identifier
IEEE Institute of Electrical and Electronics Engineers
IoT Internet of Things
IP Internet protocol
LEE Laptop-embedded equipment
LME Laptop-mounted equipment
LOS Line of Sight
LTE Long-Term Evolution
M2M Machine-to-machine
MANO Management and orchestration
MCE Multicast coordination entity
MDT Minimization of Drive Tests
MIMO Multiple-input multiple-output
MME Mobility Management Entity
MSC Mobile Switching Center
MSR Multi-standard radio
MTC Machine type communications
NB-IOT Narrow band internet of things
NFV Network function virtualization
NIC Network interface controller
NR New Radio
OSS Operations Support System
OTT Over-the-top
O&M Operation and Maintenance
PCF Policy Control Function
PDA Personal digital assistant
PDN Packet Data Network
PDUID Proximity Services Discovery User Equipment Identifier
PLMN Public Land Mobile Network
PROM Programmable read-only memory
ProSe Proximity Services
PSTN Public switched telephone network
RAID Redundant array of independent disks
RAM Random Access Memory
RAN Radio Access Network
RAT Radio Access Technology
RF Radio frequency
RNC Radio Network Controller
ROM Read-only memory
RPAUID Restricted Proximity Services Application User Identifier
RRC Radio Resource Control
RRH Remote Radio Head
RRM Radio Resource Management
RRU Remote radio unit
RUIM Removable user identity
SDRAM Synchronous dynamic random access memory
SIM Subscriber identity module
SLP Service Location Protocol
SMF Session Management Function
SOC System on a chip
SON Self Optimized Network
SONET Synchronous optical networking
SUPI Subscription Permanent Identifier
TCP Transmission control protocol
TS Technical Specification
UE User Equipment
UL Uplink
UMTS Universal Mobile Telecommunication System
USB Universal serial bus
UTRA Universal Terrestrial Radio Access
UTRAN Universal Terrestrial Radio Access Network
V2I Vehicle-to-infrastructure
V2V Vehicle-to-vehicle
V2X Vehicle-to-everything
VMM Virtual machine monitor
VNE Virtual network element
VOIP Voice over IP
VPLMN Visited Public Land Mobile Network
WANs Wide-area networks
WCDMA Wide CDMA
WD Wireless Device
WiMax Worldwide Interoperability for Microwave Access
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

According to an aspect of the disclosure, there is provided a computer program comprising instructions which, when executed by processing circuitry (such as the first network function and/or the second network function), cause the processing circuitry to perform at least part of the method described herein. According to an aspect of the disclosure, there is provided a computer program product, embodied on a non-transitory machine-readable medium, comprising instructions which are executable by processing circuitry (such as the first network function and/or the second network function) to cause the processing circuitry to perform at least part of the method described herein. According to an aspect of the disclosure, there is provided a computer program product comprising a carrier containing instructions for causing processing circuitry (such as the first network function and/or the second network function) to perform at least part of the method described herein. In some embodiments, the carrier can be any one of an electronic signal, an optical signal, an electromagnetic signal, an electrical signal, a radio signal, a microwave signal, or a computer-readable storage medium.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a direct discovery name management function, DDNMF, in a communication network, the method comprising:
   initiating transmission of a Npcf_AMPolicyAuthorization_Subscribe request or Npcf_EventExposure_Subscribe request towards a policy control function, PCF, wherein the request is indicative that the DDNMF is to be subscribed to receive a notification of a change in a proximity services discovery user equipment identifier, PDUID, for a user equipment, UE, from the PCF;
   receiving the PDUID for the UE from the PCF; and
   initiating transmission of information towards the PCF, wherein the information is indicative that the DDNMF is to be unsubscribed from receiving the notification.

2. A method as claimed in claim 1, wherein:
   the request comprises an event identifier for the notification of the change in the PDUID for the UE.

3. A method as claimed in claim 1, the method comprising:
   receiving at least one updated PDUID for the UE from the PCF.

4. A method as claimed in claim 3, wherein:
   receiving the at least one updated PDUID for the UE in response to the at least one updated PDUID being generated for the UE.

5. A method as claimed in claim 3, the method comprising:
   receiving the at least one updated PDUID for the UE with an indication that the notification of the change in the PDUID for the UE has been met.

6. A method as claimed in claim 1, wherein:
   initiating transmission of the information comprises initiating transmission of a second service operation request and the second service operation request comprises the information.

7. A method as claimed in claim 6, wherein:
   the second service operation request is an Npcf_AMPolicyAuthorization_Unsubscribe request or an Npcf_EventExposure_Unsubscribe request.

8. A method as claimed in claim 1, wherein:
   transmission of the Npcf_AMPolicyAuthorization_Subscribe request or Npcf_EventExposure_Subscribe request is initiated in response to:
      receiving a discovery request from the UE, wherein the discovery request is a request for a restricted discovery code; and/or
      the DDNMF not having a UE context for the UE.

9. A method as claimed in claim 1, wherein:
   initiating transmission of the Npcf_AMPolicyAuthorization_Subscribe request or Npcf_EventExposure_Subscribe request comprises:
      initiating transmission of the Npcf_AMPolicy Authorization_Subscribe request or Npcf_EventExposure_Subscribe request with a subscription permanent identifier, SUPI, for the UE.

10. A method as claimed in claim 1, the method comprising:
   receiving the PDUID for the UE with an associated expiration timer.

11. A direct discovery name management function, DDNMF, comprising:
   processing circuitry configured to operate in accordance with claim 1.

12. A direct discovery name management function, DDNMF, as claimed in claim 11, wherein:
   the DDNMF comprises:
   at least one memory for storing instructions which, when executed by the processing circuitry, cause the DDNMF to initiate transmission of a Npcf_AMPolicyAuthorization_Subscribe request or Npcf_EventExposure_Subscribe request towards a policy control function, PCF, wherein the request is indicative that the DDNMF is to be subscribed to receive a notification of a change in a proximity services discovery user equipment identifier, PDUID, for a user equipment, UE, from the PCF;
   receive the PDUID for the UE from the PCF; and
   initiating transmission of information towards the PCF, wherein the information is indicative that the DDNMF is to be unsubscribed from receiving the notification.

13. A method of operating a policy control function, PCF, in a communication network, the method comprising:
   subscribing a direct discovery name management function, DDNMF, to receive a notification of a change in a proximity services discovery user equipment identifier, PDUID, for a user equipment, UE, from the PCF in response to receiving a Npcf_AMPolicyAuthorization_Subscribe request or Npcf_EventExposure_Subscribe request from the DDNMF, wherein the request is indicative that the DDNMF is to be subscribed to receive the notification;
   initiating transmission of the PDUID for the UE towards the DDNMF; and
   unsubscribing the DDNMF from receiving the notification in response to receiving information from the DDNMF, wherein the information is indicative that the DDNMF is to be unsubscribed from receiving the notification.

14. A method as claimed in claim 13, wherein:
   the request comprises an event identifier for the notification of the change in the PDUID for the UE.

15. A method as claimed in claim 13, the method comprising:
   initiating transmission of at least one updated PDUID for the UE towards the DDNMF.

16. A method as claimed in claim 15, wherein:
   transmission of the at least one updated PDUID for the UE is initiated in response to the at least one updated PDUID being generated for the UE.

17. A method as claimed in claim 15, the method comprising:
   initiating transmission of the at least one updated PDUID for the UE with an indication that the notification of the change in the PDUID for the UE has been met.

18. A method as claimed in claim 13, wherein:
   receiving the information comprises receiving a second service operation request and the second service operation request comprises the information.

19. A method as claimed in claim 18, wherein:

the second service operation request is an Npcf_AMPolicyAuthorization_Unsubscribe request or an Npcf_EventExposure_Unsubscribe request.

20. A method as claimed in claim 13, wherein:

the Npcf_AMPolicyAuthorization_Subscribe request or Npcf_EventExposure_Subscribe request is received in response to:

a discovery request from the UE, wherein the discovery request is a request for a restricted discovery code; and/or the DDNMF not having a UE context for the UE.

21. A method as claimed in claim 13, the method wherein:

the Npcf_AMPolicyAuthorization_Subscribe request or Npcf_EventExposure_Subscribe request is received with a subscription permanent identifier, SUPI, for the UE.

22. A method as claimed in claim 13, the method comprising:

initiating transmission of the PDUID for the UE with an associated expiration timer.

23. A policy control function, PCF, comprising:

processing circuitry configured to operate in accordance with claim 13.

24. A policy control function, PCF, as claimed in claim 23, wherein:

the PCF comprises:

at least one memory for storing instructions which, when executed by the processing circuitry, cause the PCF to subscribing a direct discovery name management function, DDNMF, to receive a notification of a change in a proximity services discovery user equipment identifier, PDUID, for a user equipment, UE, from the PCF in response to receiving a Npcf_AMPolicyAuthorization_Subscribe request or Npcf_EventExposure_Subscribe request from the DDNMF, wherein the request is indicative that the DDNMF is to be subscribed to receive the notification;

initiating transmission of the PDUID for the UE towards the DDNMF; and unsubscribing the DDNMF from receiving the notification in response to receiving information from the DDNMF, wherein the information is indicative that the DDNMF is to be unsubscribed from receiving the notification.

* * * * *